United States Patent
Cadet et al.

(10) Patent No.: US 12,495,135 B2
(45) Date of Patent: Dec. 9, 2025

(54) CROSSTALK CORRECTION IN DISPLAYS

(71) Applicant: Apple Inc., Cupertino, CA (US)

(72) Inventors: Gilles M Cadet, Agoura Hills, CA (US); Justin A Meiners, Boulder, CO (US); Pavel V Dudrenov, San Francisco, CA (US); Yang Li, San Jose, CA (US); Ping-Yen Chou, Santa Clara, CA (US); Hao Chen, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/780,839

(22) Filed: Jul. 23, 2024

(65) Prior Publication Data

US 2025/0247515 A1    Jul. 31, 2025

Related U.S. Application Data

(60) Provisional application No. 63/626,641, filed on Jan. 30, 2024.

(51) Int. Cl.
*H04N 13/327* (2018.01)
*H04N 13/305* (2018.01)
*H04N 13/383* (2018.01)

(52) U.S. Cl.
CPC ......... *H04N 13/327* (2018.05); *H04N 13/305* (2018.05); *H04N 13/383* (2018.05)

(58) Field of Classification Search
None
See application file for complete search history.

(56) References Cited

U.S. PATENT DOCUMENTS

| | | | |
|---|---|---|---|
| 9,866,825 B2 | 1/2018 | Baik et al. | |
| 11,750,795 B2 | 9/2023 | Huang et al. | |
| 2016/0044305 A1* | 2/2016 | Kim | H04N 13/351 348/54 |
| 2016/0050376 A1* | 2/2016 | Fridental | H04N 25/76 348/302 |
| 2016/0323566 A1* | 11/2016 | Vdovin | G02B 30/29 |
| 2021/0098520 A1* | 4/2021 | Cai | H10F 39/8063 |
| 2023/0326380 A1 | 10/2023 | He et al. | |

OTHER PUBLICATIONS

U.S. Appl. No. 17/885,455, filed Aug. 10, 2022.
U.S. Appl. No. 18/072,192, filed Nov. 30, 2022.

* cited by examiner

*Primary Examiner* — Eileen M Adams
(74) *Attorney, Agent, or Firm* — Treyz Law Group, P.C.; Joseph F. Guihan; Jinie M. Guihan

(57) ABSTRACT

An electronic device may include a lenticular display. The lenticular display may have a lenticular lens film formed over an array of pixels. The lenticular lenses may be configured to enable stereoscopic viewing of the display such that a viewer perceives three-dimensional images. Display pipeline circuitry for the lenticular display may implement crosstalk correction. Crosstalk correction may be performed before pixel mapping using stored crosstalk calibration profiles, crosstalk correction may be performed by ray tracing multiple beams per pixel, and/or crosstalk correction may be performed after pixel mapping using a kernel lookup table.

20 Claims, 17 Drawing Sheets

CROSSTALK CORRECTION IN DISPLAYS

This application claims the benefit of U.S. provisional patent application No. 63/626,641 filed Jan. 30, 2024, which is hereby incorporated by reference herein in its entirety.

FIELD

This relates generally to electronic devices, and, more particularly, to electronic devices with displays.

BACKGROUND

Electronic devices often include displays. In some cases, displays may include lenticular lenses that enable the display to provide three-dimensional content to the viewer. The lenticular lenses may be formed over an array of pixels such as organic light-emitting diode pixels or liquid crystal display pixels.

SUMMARY

A method of operating an electronic device with a display may include, for each pixel in a first image, determining a corresponding crosstalk calibration profile using stored crosstalk calibration profile information, for each pixel in the first image, determining crosstalk using the crosstalk calibration profile for that pixel, obtaining a second image by applying a sharpening filter to the first image using the determined crosstalk for each pixel, and mapping the second image to the display.

A method of operating an electronic device with a display having an array of pixels and a plurality of lenticular lenses that overlaps the array of pixels may include estimating contributions of an input two-dimensional image of content to a first three-dimensional image in a plurality of directions through the plurality of lenticular lenses, generating a second three-dimensional image having a plurality of views of the content, and based on the estimated contributions, mitigating crosstalk between different pixels in the array of pixels associated with different views of the plurality of views.

A method of operating an electronic device with a display having an array of pixels may include mapping a two-dimensional image of content to the array of pixels to obtain a three-dimensional image having a plurality of views of the content, for each pixel in the array of pixels, determining a corresponding blur kernel (e.g., using a lookup table), and applying the blur kernels to the three-dimensional image in a convolution pass to mitigate crosstalk.

DETAILED DESCRIPTION

Figure 1:
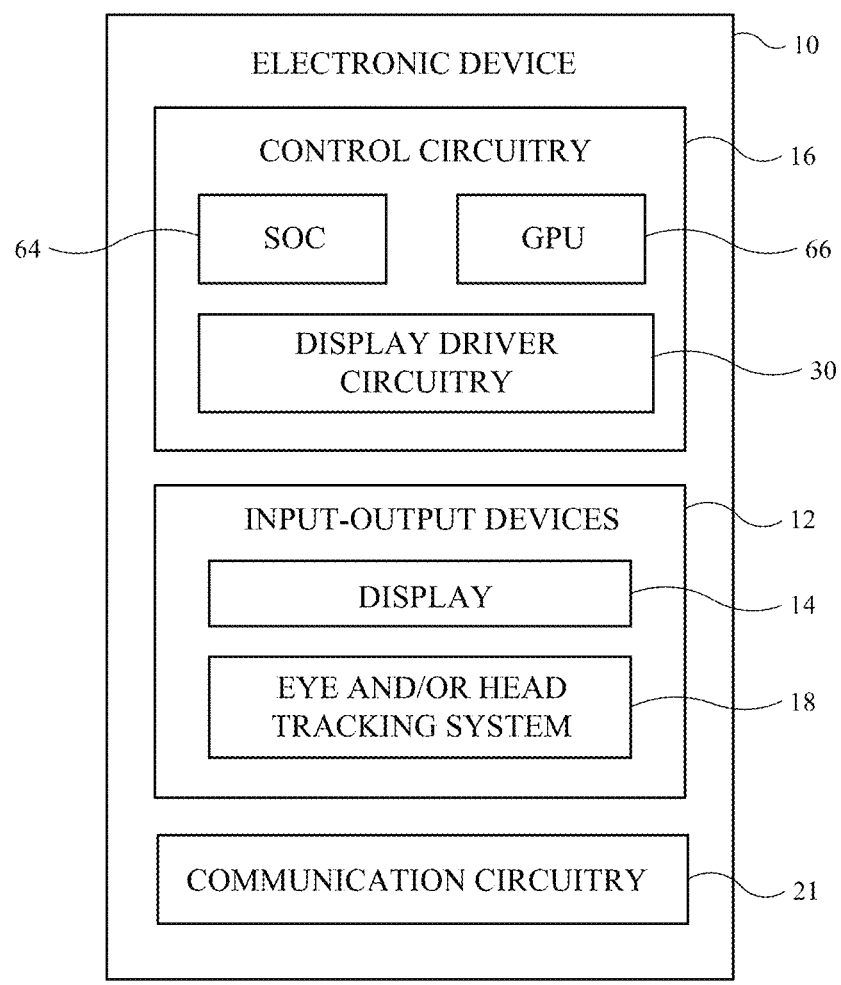
FIG. 1 is a schematic diagram of an illustrative electronic device having a display in accordance with some embodiments.

An illustrative electronic device of the type that may be provided with a display is shown in FIG. 1. Electronic device 10 may be a computing device such as a laptop computer, a computer monitor containing an embedded computer, a tablet computer, a cellular telephone, a media player, or other handheld or portable electronic device, a smaller device such as a wrist-watch device, a pendant device, a headphone or earpiece device, an augmented reality (AR) headset and/or virtual reality (VR) headset, a device embedded in eyeglasses or other equipment worn on a user's head, or other wearable or miniature device, a display, a computer display that contains an embedded computer, a computer display that does not contain an embedded computer, a gaming device, a navigation device, an embedded system such as a system in which electronic equipment with a display is mounted in a kiosk or automobile, or other electronic equipment.

As shown in FIG. 1, electronic device 10 may have control circuitry 16. Control circuitry 16 may be configured to perform operations in electronic device 10 using hardware (e.g., dedicated hardware or circuitry), firmware and/or software. Software code for performing operations in electronic device 10 and other data is stored on non-transitory computer readable storage media (e.g., tangible computer readable storage media) in control circuitry 16. The software code may sometimes be referred to as software, data, program instructions, instructions, or code. The non-transitory computer readable storage media (sometimes referred to generally as memory) may include non-volatile memory such as non-volatile random-access memory (NVRAM), one or more hard drives (e.g., magnetic drives or solid state drives), one or more removable flash drives or other removable media, or the like. Software stored on the non-transitory computer readable storage media may be executed on the processing circuitry of control circuitry 16. The processing circuitry may include application-specific integrated circuits with processing circuitry, one or more microprocessors, digital signal processors, graphics processing units, a central processing unit (CPU) or other processing circuitry.

As shown in FIG. 1, control circuitry 16 may include system circuitry 64 (sometimes referred to as system-on-chip (SOC) 64) that includes one or more microprocessors, multi-core processors, microcontrollers, application specific integrated circuits, etc. Control circuitry 16 may also include a graphics processing unit (GPU) 66 and display driver circuitry 30. Display driver circuitry 30 may include integrated circuits, thin-film transistor circuits, or other suitable circuitry.

To support communications between device 10 and external equipment, control circuitry 16 may communicate using communications circuitry 21. Circuitry 21 may include antennas, radio-frequency transceiver circuitry, and other wireless communications circuitry and/or wired communications circuitry. Circuitry 21, which may sometimes be referred to as control circuitry and/or control and communications circuitry, may support bidirectional wireless communications between device 10 and external equipment over a wireless link (e.g., circuitry 21 may include radio-frequency transceiver circuitry such as wireless local area network transceiver circuitry configured to support communications over a wireless local area network link, near-field communications transceiver circuitry configured to support communications over a near-field communications link, cellular telephone transceiver circuitry configured to support communications over a cellular telephone link, or transceiver circuitry configured to support communications over any other suitable wired or wireless communications link). Wireless communications may, for example, be supported over a Bluetooth® link, a WiFi® link, a 60 GHz link or other millimeter wave link, a cellular telephone link, or other wireless communications link. Device 10 may, if desired, include power circuits for transmitting and/or receiving wired and/or wireless power and may include batteries or other energy storage devices. For example, device 10 may include a coil and rectifier to receive wireless power that is provided to circuitry in device 10.

Input-output circuitry in device 10 such as input-output devices 12 may be used to allow data to be supplied to device 10 and to allow data to be provided from device 10 to external devices. Input-output devices 12 may include buttons, joysticks, scrolling wheels, touch pads, key pads, keyboards, microphones, speakers, tone generators, vibrators, cameras, sensors, light-emitting diodes and other status indicators, data ports, and other electrical components. A user can control the operation of device 10 by supplying commands through input-output devices 12 and may receive status information and other output from device 10 using the output resources of input-output devices 12.

Input-output devices 12 may include one or more displays such as display 14. Display 14 may be a touch screen display that includes a touch sensor for gathering touch input from a user or display 14 may be insensitive to touch. A touch sensor for display 14 may be based on an array of capacitive touch sensor electrodes, acoustic touch sensor structures, resistive touch components, force-based touch sensor structures, a light-based touch sensor, or other suitable touch sensor arrangements.

Some electronic devices may include two displays. In one possible arrangement, a first display may be positioned on one side of the device and a second display may be positioned on a second, opposing side of the device. The first and second displays therefore may have a back-to-back arrangement. One or both of the displays may be curved.

Sensors in input-output devices 12 may include force sensors (e.g., strain gauges, capacitive force sensors, resistive force sensors, etc.), audio sensors such as microphones, touch and/or proximity sensors such as capacitive sensors (e.g., a two-dimensional capacitive touch sensor integrated into display 14, a two-dimensional capacitive touch sensor overlapping display 14, and/or a touch sensor that forms a button, trackpad, or other input device not associated with a display), and other sensors. If desired, sensors in input-output devices 12 may include optical sensors such as optical sensors that emit and detect light, ultrasonic sensors, optical touch sensors, optical proximity sensors, and/or other touch sensors and/or proximity sensors, monochromatic and color ambient light sensors, image sensors, fingerprint sensors, temperature sensors, sensors for measuring three-dimensional non-contact gestures ("air gestures"), pressure sensors, sensors for detecting position, orientation, and/or motion (e.g., accelerometers, magnetic sensors such as compass sensors, gyroscopes, and/or inertial measurement units that contain some or all of these sensors), health sensors, radio-frequency sensors, depth sensors (e.g., structured light sensors and/or depth sensors based on stereo imaging devices), optical sensors such as self-mixing sensors and light detection and ranging (lidar) sensors that gather time-of-flight measurements, humidity sensors, moisture sensors, gaze tracking sensors, and/or other sensors.

Control circuitry 16 may be used to run software on device 10 such as operating system code and applications. During operation of device 10, the software running on control circuitry 16 may display images on display 14 using an array of pixels in display 14.

Display 14 may be an organic light-emitting diode display, a liquid crystal display, an electrophoretic display, an electrowetting display, a plasma display, a microelectromechanical systems display, a display having a pixel array formed from crystalline semiconductor light-emitting diode dies (sometimes referred to as microLEDs), and/or other display. Configurations in which display 14 is an organic light-emitting diode display are sometimes described herein as an example.

Display 14 may have a rectangular shape (i.e., display 14 may have a rectangular footprint and a rectangular peripheral edge that runs around the rectangular footprint) or may have other suitable shapes. Display 14 may be planar or may have a curved profile.

Device 10 may include cameras and other components that form part of gaze and/or head tracking system 18. The camera(s) or other components of system 18 may face an expected location for a viewer and may track the viewer's eyes and/or head (e.g., images and other information captured by system 18 may be analyzed by control circuitry 16 to determine the location of the viewer's eyes and/or head). This head-location information obtained by system 18 may be used to determine the appropriate direction with which display content from display 14 should be directed. Eye and/or head tracking system 18 may include any desired number/combination of infrared and/or visible light detectors. Eye and/or head tracking system 18 may optionally include light emitters to illuminate the scene.

Figure 2:
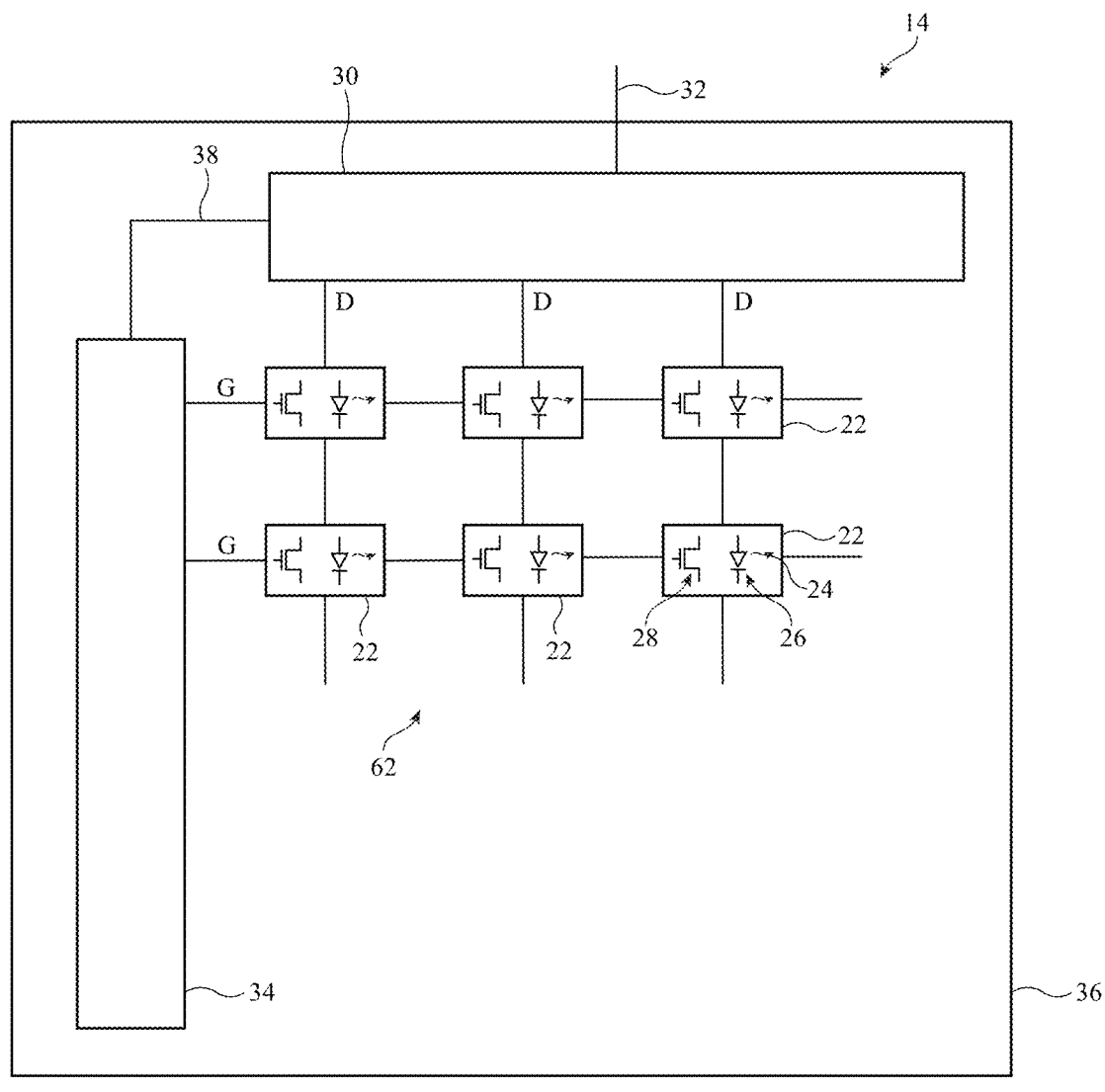
FIG. 2 is a top view of an illustrative display in an electronic device in accordance with some embodiments.

A top view of a portion of display 14 is shown in FIG. 2. As shown in FIG. 2, display 14 may have an array of pixels 22 formed on substrate 36. Substrate 36 may be formed from glass, metal, plastic, ceramic, or other substrate materials. Pixels 22 may receive data signals over signal paths such as data lines D and may receive one or more control signals over control signal paths such as horizontal control lines G (sometimes referred to as gate lines, scan lines, emission control lines, etc.). There may be any suitable number of rows and columns of pixels 22 in display 14 (e.g., tens or more, hundreds or more, or thousands or more). Each pixel 22 may have a light-emitting diode 26 that emits light 24 under the control of a pixel circuit formed from thin-film transistor circuitry (such as thin-film transistors 28 and thin-film capacitors). Thin-film transistors 28 may be polysilicon thin-film transistors, semiconducting-oxide thin-film transistors such as indium gallium zinc oxide transistors, or thin-film transistors formed from other semiconductors. Pixels 22 may contain light-emitting diodes of different colors (e.g., red, green, and blue diodes for red, green, and blue pixels, respectively) to provide display 14 with the ability to display color images.

Display driver circuitry may be used to control the operation of pixels 22. The display driver circuitry may be formed from integrated circuits, thin-film transistor circuits, or other suitable circuitry. Display driver circuitry 30 of FIG. 2 may contain communications circuitry for communicating with system control circuitry such as control circuitry 16 of FIG. 1 over path 32. Path 32 may be formed from traces on a flexible printed circuit or other cable. During operation, the control circuitry (e.g., control circuitry 16 of FIG. 1) may supply circuitry 30 with information on images to be displayed on display 14.

To display the images on display pixels 22, display driver circuitry 30 may supply image data to data lines D while issuing clock signals and other control signals to supporting display driver circuitry such as gate driver circuitry 34 over path 38. If desired, circuitry 30 may also supply clock signals and other control signals to gate driver circuitry on an opposing edge of display 14.

Gate driver circuitry 34 (sometimes referred to as horizontal control line control circuitry) may be implemented as part of an integrated circuit and/or may be implemented using thin-film transistor circuitry. Horizontal control lines G in display 14 may carry gate line signals (scan line signals), emission enable control signals, and other horizontal control signals for controlling the pixels of each row. There may be any suitable number of horizontal control signals per row of pixels 22 (e.g., one or more, two or more, three or more, four or more, etc.).

Display 14 may sometimes be a stereoscopic display that is configured to display three-dimensional content for a viewer. Stereoscopic displays are capable of displaying multiple two-dimensional images that are visible from slightly different angles. When viewed together, the combination of the two-dimensional images creates the illusion of a three-dimensional image for the viewer. For example, a viewer's left eye may receive a first two-dimensional image and a viewer's right eye may receive a second, different two-dimensional image. The viewer perceives these two different two-dimensional images as a single three-dimensional image.

There are numerous ways to implement a stereoscopic display. Display 14 may be a lenticular display that uses lenticular lenses (e.g., elongated lenses that extend along parallel axes), may be a parallax barrier display that uses parallax barriers (e.g., an opaque layer with precisely spaced slits to create a sense of depth through parallax), may be a volumetric display, or may be any other desired type of stereoscopic display. Configurations in which display 14 is a lenticular display are sometimes described herein as an example.

Figure 3:
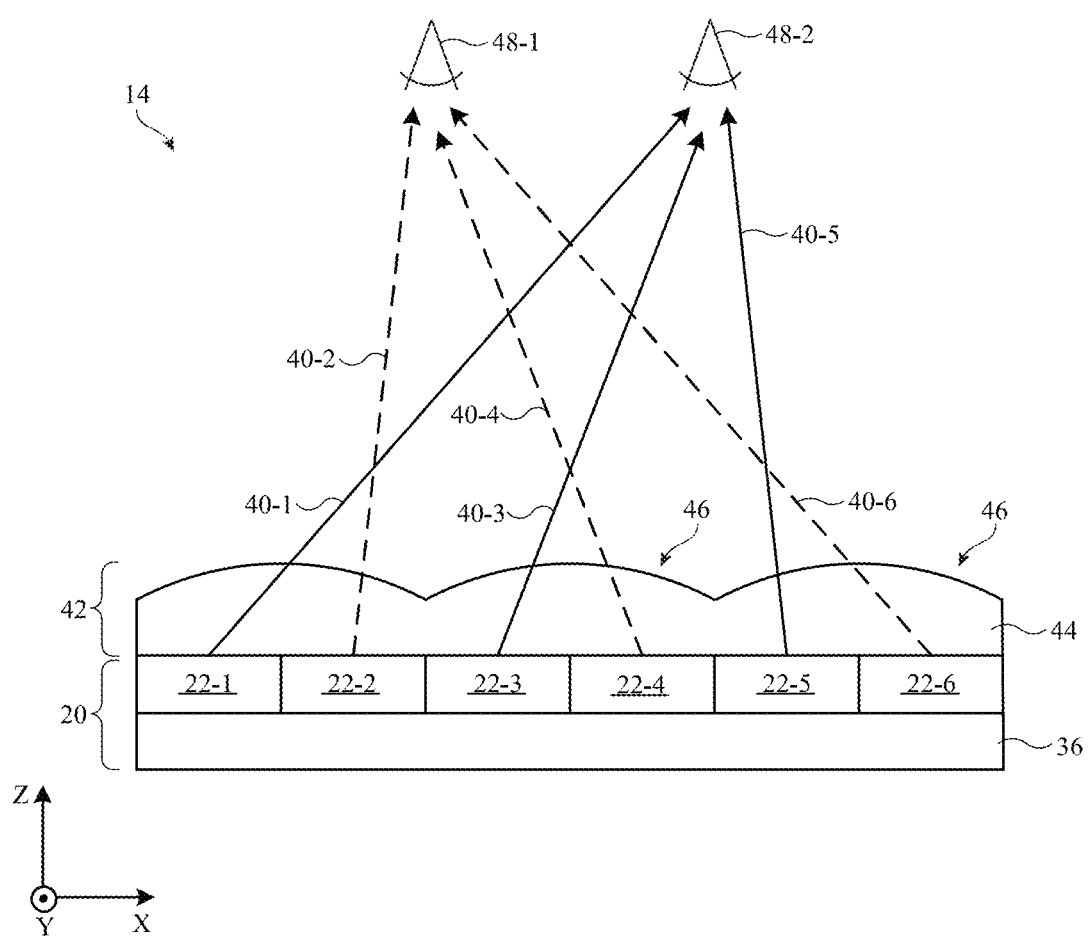
FIG. 3 is a cross-sectional side view of an illustrative lenticular display that provides images to a viewer in accordance with some embodiments.

FIG. 3 is a cross-sectional side view of an illustrative lenticular display that may be incorporated into electronic device 10. Display 14 includes a display panel 20 with pixels 22 on substrate 36. Substrate 36 may be formed from glass, metal, plastic, ceramic, or other substrate materials and pixels 22 may be organic light-emitting diode pixels, liquid crystal display pixels, or any other desired type of pixels.

As shown in FIG. 3, lenticular lens film 42 may be formed over the display pixels. Lenticular lens film 42 (sometimes referred to as a light redirecting film, a lens film, etc.) includes lenses 46 and a base film portion 44 (e.g., a planar film portion to which lenses 46 are attached). Lenses 46 may be lenticular lenses that extend along respective longitudinal axes (e.g., axes that extend into the page parallel to the Y-axis). Lenses 46 may be referred to as lenticular elements 46, lenticular lenses 46, optical elements 46, etc.

The lenses 46 of the lenticular lens film cover the pixels of display 14. An example is shown in FIG. 3 with display pixels 22-1, 22-2, 22-3, 22-4, 22-5, and 22-6. In this example, display pixels 22-1 and 22-2 are covered by a first lenticular lens 46, display pixels 22-3 and 22-4 are covered by a second lenticular lens 46, and display pixels 22-5 and 22-6 are covered by a third lenticular lens 46. The lenticular lenses may redirect light from the display pixels to enable stereoscopic viewing of the display.

Consider the example of display 14 being viewed by a viewer with a first eye (e.g., a right eye) 48-1 and a second eye (e.g., a left eye) 48-2. Light from pixel 22-1 is directed by the lenticular lens film in direction 40-1 towards left eye 48-2, light from pixel 22-2 is directed by the lenticular lens film in direction 40-2 towards right eye 48-1, light from pixel 22-3 is directed by the lenticular lens film in direction 40-3 towards left eye 48-2, light from pixel 22-4 is directed by the lenticular lens film in direction 40-4 towards right eye 48-1, light from pixel 22-5 is directed by the lenticular lens film in direction 40-5 towards left eye 48-2, light from pixel 22-6 is directed by the lenticular lens film in direction 40-6 towards right eye 48-1. In this way, the viewer's right eye 48-1 receives images from pixels 22-2, 22-4, and 22-6, whereas left eye 48-2 receives images from pixels 22-1, 22-3, and 22-5. Pixels 22-2, 22-4, and 22-6 may be used to display a slightly different image than pixels 22-1, 22-3, and 22-5. Consequently, the viewer may perceive the received images as a single three-dimensional image.

Pixels of the same color may be covered by a respective lenticular lens 46. In one example, pixels 22-1 and 22-2 may be red pixels that emit red light, pixels 22-3 and 22-4 may be green pixels that emit green light, and pixels 22-5 and 22-6 may be blue pixels that emit blue light. This example is merely illustrative. In general, each lenticular lens may cover any desired number of pixels each having any desired color. The lenticular lens may cover a plurality of pixels having the same color, may cover a plurality of pixels each having different colors, may cover a plurality of pixels with some pixels being the same color and some pixels being different colors, etc.

Figure 4:
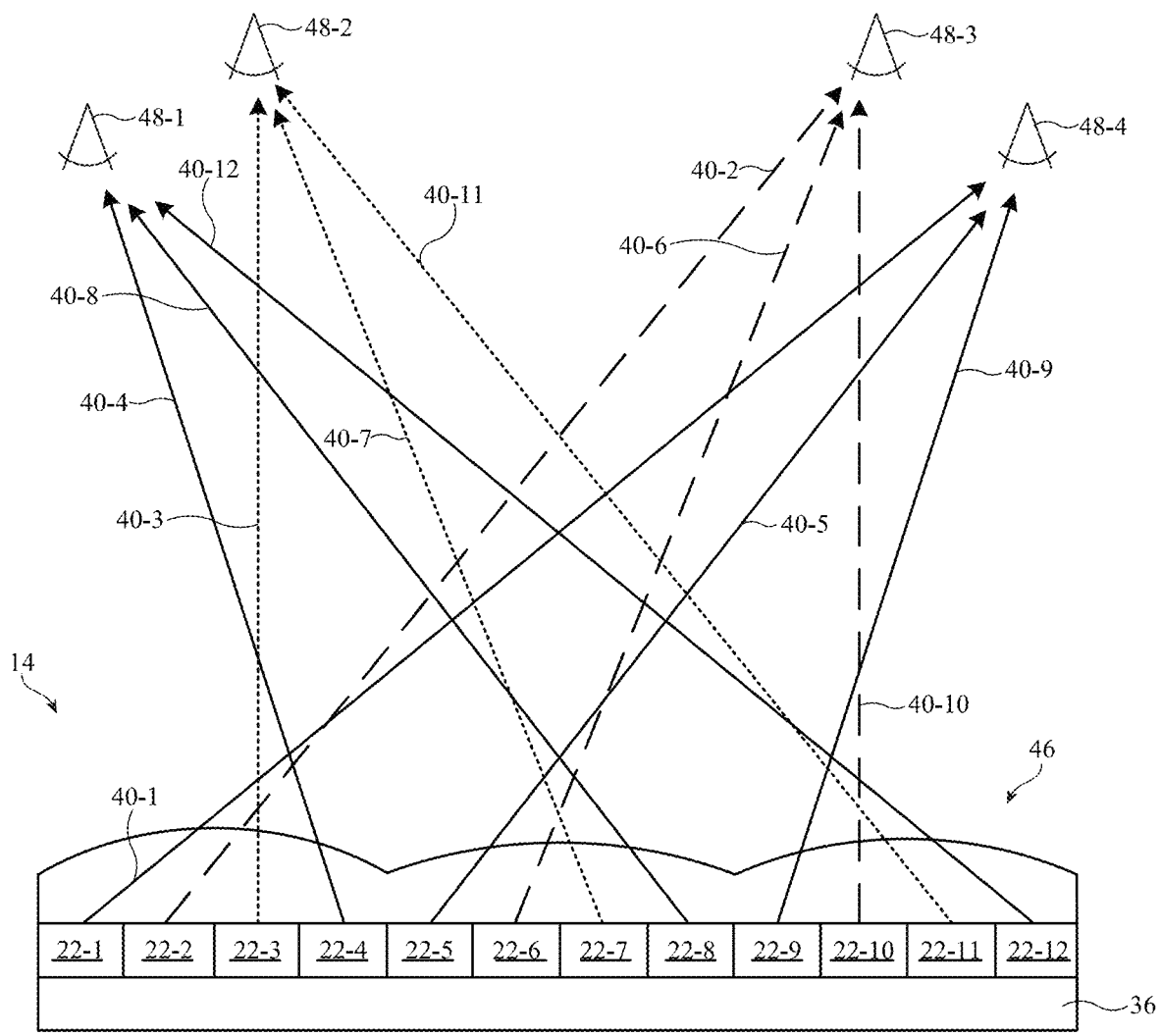
FIG. 4 is a cross-sectional side view of an illustrative lenticular display that provides images to two or more viewers in accordance with some embodiments.

FIG. 4 is a cross-sectional side view of an illustrative stereoscopic display showing how the stereoscopic display may be viewable by multiple viewers. The stereoscopic display of FIG. 3 may have one optimal viewing position (e.g., one viewing position where the images from the display are perceived as three-dimensional). The stereoscopic display of FIG. 4 may have two or more optimal viewing positions (e.g., two or more viewing positions where the images from the display are perceived as three-dimensional).

Display 14 may be viewed by both a first viewer with a right eye 48-1 and a left eye 48-2 and a second viewer with a right eye 48-3 and a left eye 48-4. Light from pixel 22-1 is directed by the lenticular lens film in direction 40-1 towards left eye 48-4, light from pixel 22-2 is directed by the lenticular lens film in direction 40-2 towards right eye 48-3, light from pixel 22-3 is directed by the lenticular lens film in direction 40-3 towards left eye 48-2, light from pixel 22-4 is directed by the lenticular lens film in direction 40-4 towards right eye 48-1, light from pixel 22-5 is directed by the lenticular lens film in direction 40-5 towards left eye 48-4, light from pixel 22-6 is directed by the lenticular lens film in direction 40-6 towards right eye 48-3, light from pixel 22-7 is directed by the lenticular lens film in direction 40-7 towards left eye 48-2, light from pixel 22-8 is directed by the lenticular lens film in direction 40-8 towards right eye 48-1, light from pixel 22-9 is directed by the lenticular lens film in direction 40-9 towards left eye 48-4, light from pixel 22-10 is directed by the lenticular lens film in direction 40-10 towards right eye 48-3, light from pixel 22-11 is directed by the lenticular lens film in direction 40-11 towards left eye 48-2, and light from pixel 22-12 is directed by the lenticular lens film in direction 40-12 towards right eye 48-1. In this way, the first viewer's right eye 48-1 receives images from pixels 22-4, 22-8, and 22-12, whereas left eye 48-2 receives images from pixels 22-3, 22-7, and 22-11. Pixels 22-4, 22-8, and 22-12 may be used to display a slightly different image than pixels 22-3, 22-7, and 22-11. Consequently, the first viewer may perceive the received images as a single three-dimensional image. Similarly, the second viewer's right eye 48-3 receives images from pixels 22-2, 22-6, and 22-10, whereas left eye 48-4 receives images from pixels 22-1, 22-5, and 22-9. Pixels 22-2, 22-6, and 22-10 may be used to display a slightly different image than pixels 22-1, 22-5, and 22-9. Consequently, the second viewer may perceive the received images as a single three-dimensional image.

Pixels of the same color may be covered by a respective lenticular lens 46. In one example, pixels 22-1, 22-2, 22-3, and 22-4 may be red pixels that emit red light, pixels 22-5, 22-6, 22-7, and 22-8 may be green pixels that emit green light, and pixels 22-9, 22-10, 22-11, and 22-12 may be blue pixels that emit blue light. This example is merely illustrative. The display may be used to present the same three-dimensional image to both viewers or may present different three-dimensional images to different viewers. In some cases, control circuitry in the electronic device 10 may use eye and/or head tracking system 18 to track the position of one or more viewers and display images on the display based on the detected position of the one or more viewers.

It should be understood that the lenticular lens shapes and directional arrows of FIGS. 3 and 4 are merely illustrative. The actual rays of light from each pixel may follow more complicated paths (e.g., with redirection occurring due to refraction, total internal reflection, etc.). Additionally, light from each pixel may be emitted over a range of angles. The lenticular display may also have lenticular lenses of any desired shape or shapes. Each lenticular lens may have a width that covers two pixels, three pixels, four pixels, more than four pixels, more than ten pixels, etc. Each lenticular lens may have a length that extends across the entire display (e.g., parallel to columns of pixels in the display).

Figure 5:
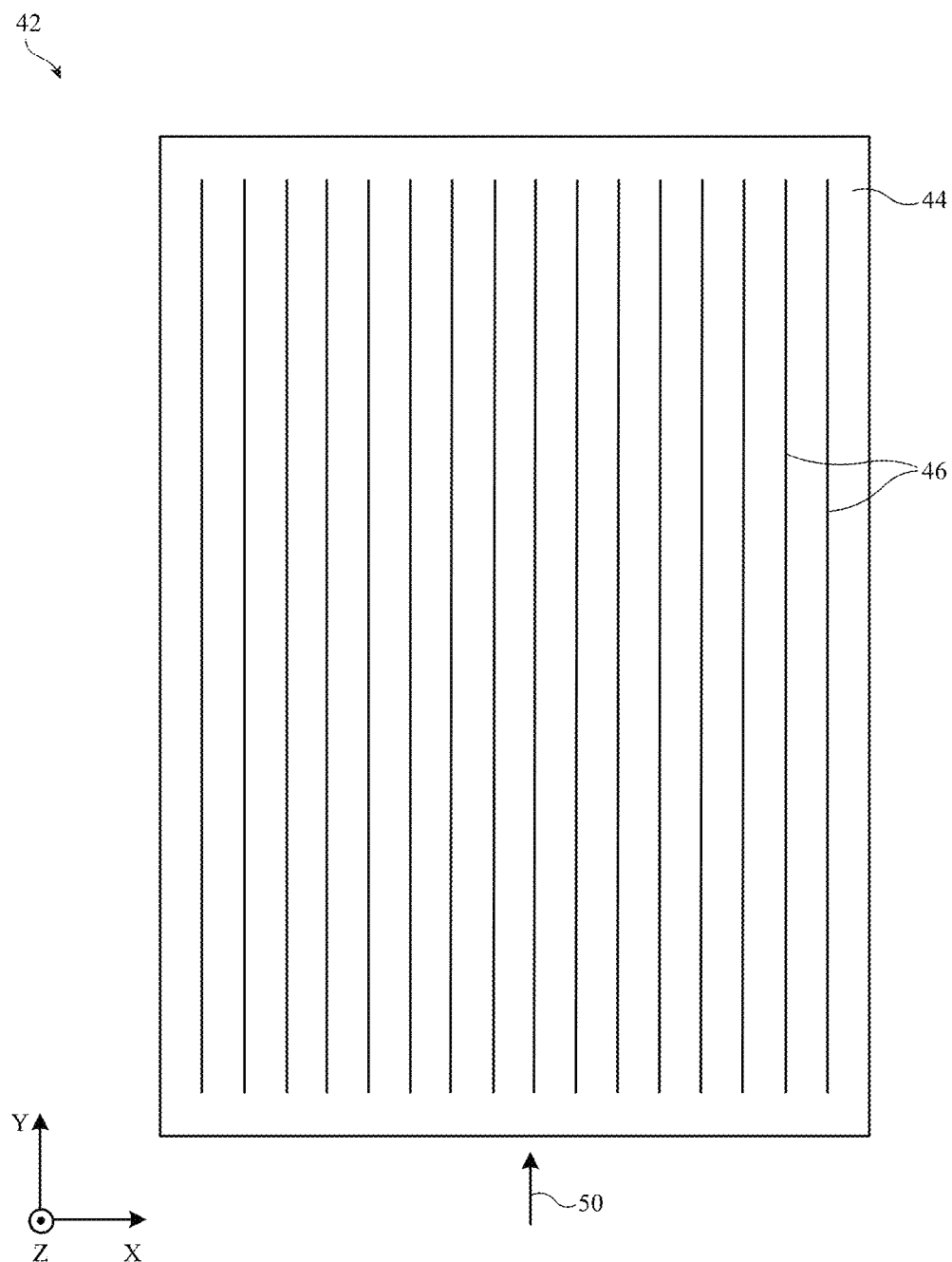
FIG. 5 is a top view of an illustrative lenticular lens film showing the elongated shape of the lenticular lenses in accordance with some embodiments.

FIG. 5 is a top view of an illustrative lenticular lens film that may be incorporated into a lenticular display. As shown in FIG. 5, elongated lenses 46 extend across the display parallel to the Y-axis. For example, the cross-sectional side view of FIGS. 3 and 4 may be taken looking in direction 50. The lenticular display may include any desired number of lenticular lenses 46 (e.g., more than 10, more than 100, more than 1,000, more than 10,000, etc.). In FIG. 5, the lenticular lenses extend perpendicular to the upper and lower edge of the display panel. This arrangement is merely illustrative, and the lenticular lenses may instead extend parallel to the X-axis or at a non-zero, non-perpendicular angle (e.g., diagonally) relative to the display panel if desired.

Figure 6:
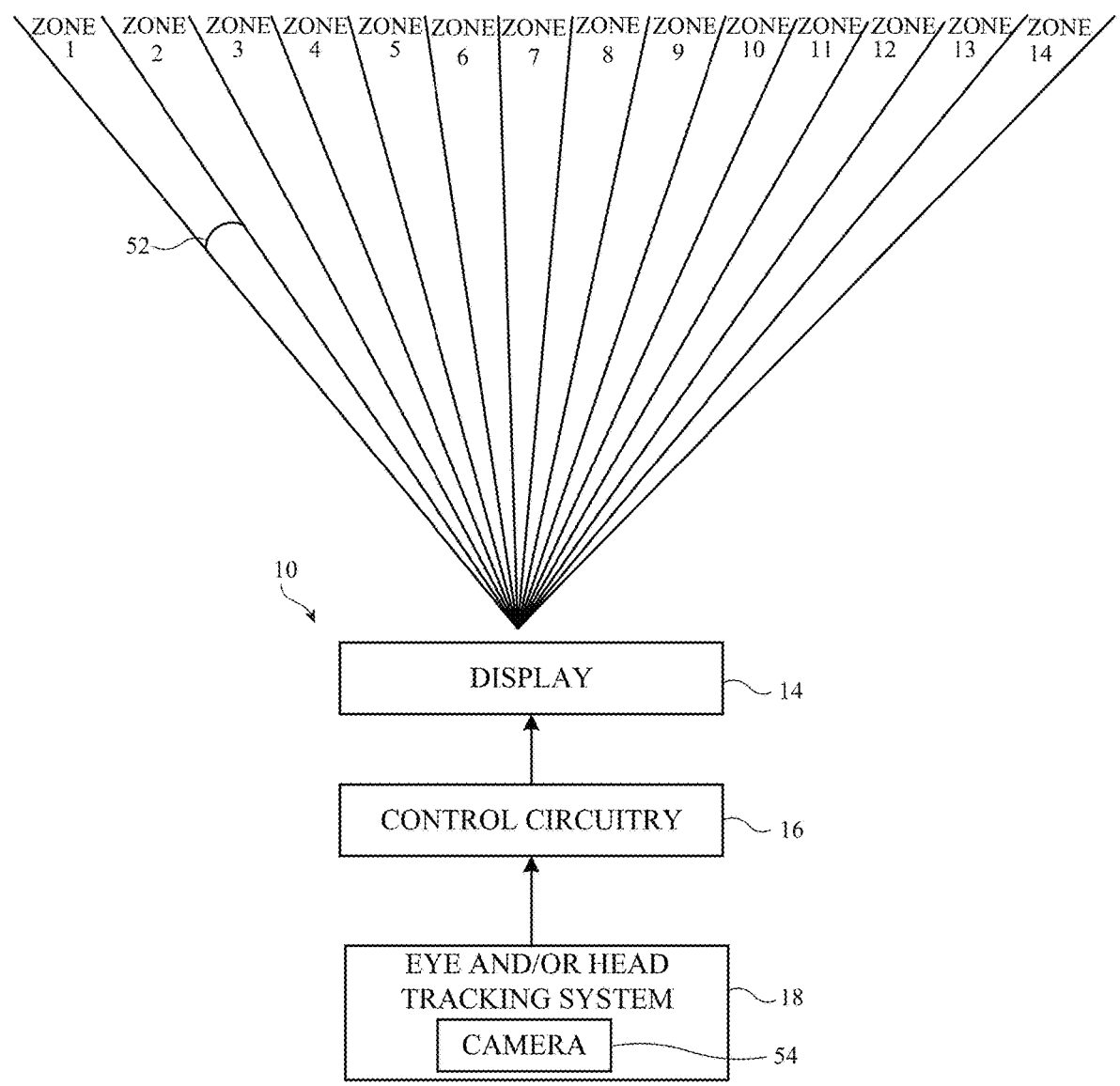
FIG. 6 is a diagram of an illustrative display that includes an eye and/or head tracking system that determines viewer eye position and control circuitry that updates the display based on the viewer eye position in accordance with some embodiments.

FIG. 6 is a schematic diagram of an illustrative electronic device showing how information from eye and/or head tracking system 18 may be used to control operation of the display. As shown in FIG. 6, display 14 is capable of providing unique images across a number of distinct zones. In FIG. 6, display 14 emits light across 14 zones, each having a respective angle of view 52. The angle 52 may be between 1 degrees and 2 degrees, between 0 degrees and 4 degrees, less than 5 degrees, less than 3 degrees, less than 2 degrees, less than 1.5 degrees, between 0.5 degrees and 4 degrees, greater than 0.5 degrees, or any other desired angle. Each zone may have the same associated viewing angle or different zones may have different associated viewing angles.

The example herein of the display having 14 independently controllable zones is merely illustrative. In general, the display may have any desired number of independently controllable zones (e.g., more than 2, more than 6, more than 10, more than 12, more than 16, more than 20, more than 30, more than 40, less than 40, between 10 and 30, between 12 and 25, etc.).

Each zone is capable of displaying a unique image to the viewer. The sub-pixels on display 14 may be divided into groups, with each group of sub-pixels capable of displaying an image for a particular zone. For example, a first subset of sub-pixels in display 14 is used to display an image (e.g., a two-dimensional image) for zone 1, a second subset of sub-pixels in display 14 is used to display an image for zone 2, a third subset of sub-pixels in display 14 is used to display an image for zone 3, etc. In other words, the sub-pixels in display 14 may be divided into 14 groups, with each group associated with a corresponding zone (sometimes referred to as viewing zone) and capable of displaying a unique image for that zone. The sub-pixel groups may also themselves be referred to as zones.

Control circuitry 16 may control display 14 to display desired images in each viewing zone. There is much flexibility in how the display provides images to the different viewing zones. Display 14 may display entirely different content in different zones of the display. For example, an image of a first object (e.g., a cube) is displayed for zone 1, an image of a second, different object (e.g., a pyramid) is displayed for zone 2, an image of a third, different object (e.g., a cylinder) is displayed for zone 3, etc. This type of scheme may be used to allow different viewers to view entirely different scenes from the same display. However, in practice there may be crosstalk between the viewing zones. As an example, content intended for zone 3 may not be contained entirely within viewing zone 3 and may leak into viewing zones 2 and 4.

Figure 7A:
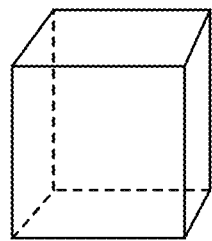
FIGS. 7A-7C are perspective views of illustrative three-dimensional content that may be displayed on different zones of a display in accordance with some embodiments.
Figure 7B:
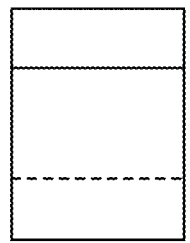
Figure 7C:
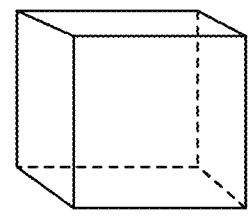

Therefore, in another possible use-case, display 14 may display a similar image for each viewing zone, with slight adjustments for perspective between each zone. This may be referred to as displaying the same content at different perspectives, with one image corresponding to a unique perspective of the same content. For example, consider an example where the display is used to display a three-dimensional cube. The same content (e.g., the cube) may be displayed on all of the different zones in the display. However, the image of the cube provided to each viewing zone may account for the viewing angle associated with that particular zone. In zone 1, for example, the viewing cone may be at a −10° angle relative to the surface normal of the display. Therefore, the image of the cube displayed for zone 1 may be from the perspective of a −10° angle relative to the surface normal of the cube (as in FIG. 7A). Zone 7, in contrast, is at approximately the surface normal of the display. Therefore, the image of the cube displayed for zone 7 may be from the perspective of a 0° angle relative to the surface normal of the cube (as in FIG. 7B). Zone 14 is at a 10° angle relative to the surface normal of the display. Therefore, the image of the cube displayed for zone 14 may be from the perspective of a 10° angle relative to the surface normal of the cube (as in FIG. 7C). As a viewer progresses from zone 1 to zone 14 in order, the appearance of the cube gradually changes to simulate looking at a real-world object.

There are many possible variations for how display 14 displays content for the viewing zones. In general, each viewing zone may be provided with any desired image based on the application of the electronic device. Different zones may provide different images of the same content at different perspectives, different zones may provide different images of different content, etc.

In one possible scenario, one or more of the zones may be disabled based on information from the eye and/or head tracking system 18. Alternatively, display 14 may display images for all of the viewing zones at the same time. In other words, the display may operate without factoring in viewer position. When operating without factoring in viewer position, all of the viewing zones may be kept on (so that the viewer sees images regardless of their position).

Figure 8:
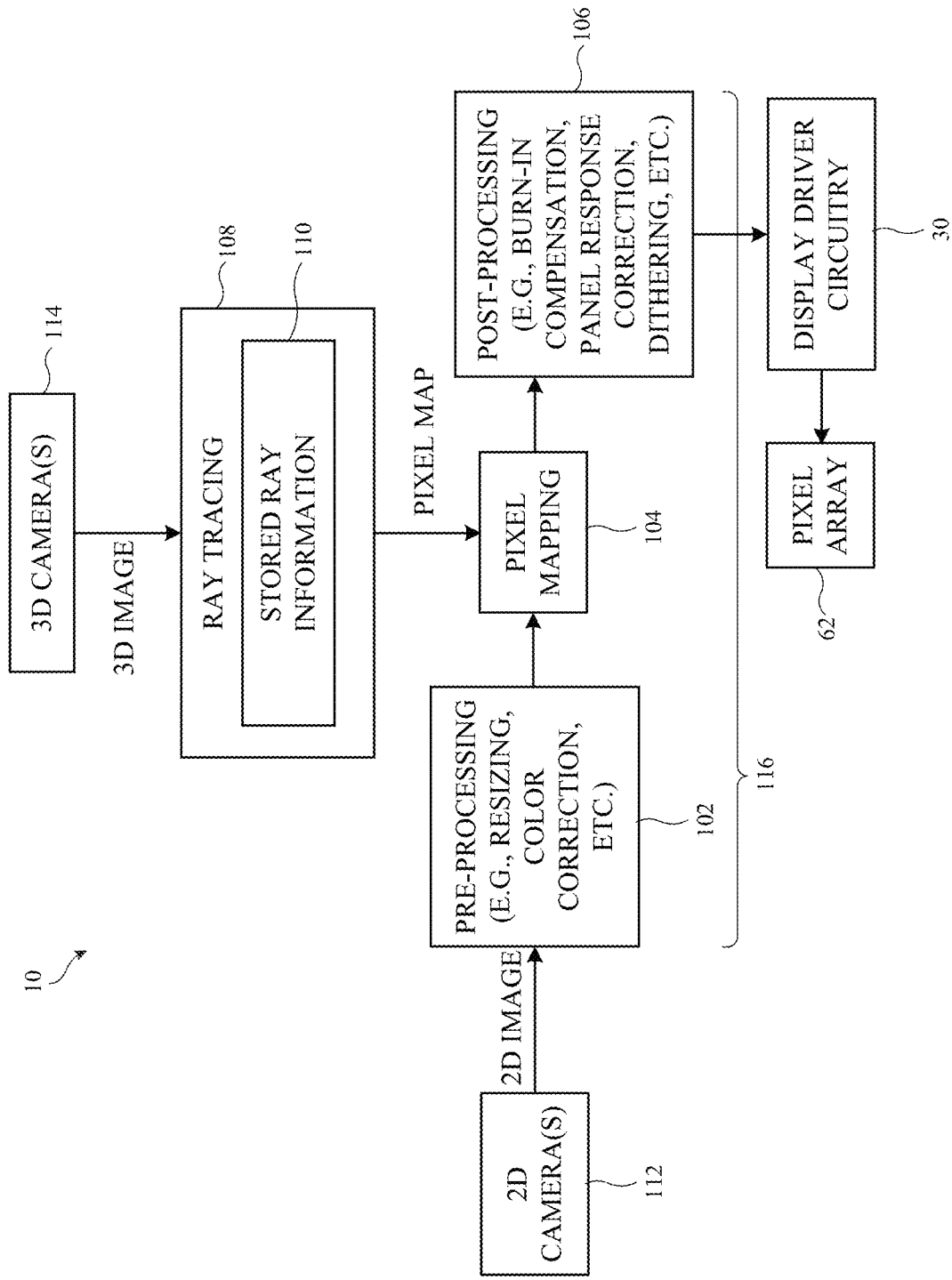
FIG. 8 is a schematic diagram of an illustrative electronic device with display pipeline circuitry in accordance with some embodiments.

FIG. 8 is a schematic diagram of display pipeline circuitry within electronic device 10. As shown in FIG. 8, electronic device 10 may include a pre-processing block 102, a pixel mapping block 104, a post-processing block 106, and a ray tracing block 108. Pre-processing block 102, pixel mapping block 104, post-processing block 106, and ray tracing block 108 may sometimes collectively be referred to as display pipeline circuitry 116.

Pre-processing block 102 (sometimes referred to as pre-processing circuitry 102) may receive a two-dimensional (2D) image as an input. In one illustrative example shown in FIG. 8, the 2D image may be received by pre-processing block 102 from a two-dimensional camera 112. The pre-processing performed by block 102 may include a wide variety of processing of the 2D image. The pre-processing may change the brightness level of one or more pixels within the 2D image.

Pre-processing circuitry 102 may be used to adjust each two-dimensional image to improve sharpness and mitigate aliasing. Once the two-dimensional image is ultimately displayed on pixel array 62 for viewing, the lenticular lenses in the display anisotropically magnify the image. In the example of FIG. 5, the lenticular lenses magnify light in the X-dimension while not magnifying the light in the Y-dimension. This example is merely illustrative and the lenticular lenses may alternatively magnify light in the Y-dimension while not magnifying the light in the X-dimension or may magnify light in both the X-dimension and the Y-dimension. In any of these arrangements, the magnification may be greater in one dimension than another (e.g., greater in the X-dimension than the Y-dimension or vice versa). This anisotropic magnification may cause aliasing in the image perceived by the user.

Pre-processing circuitry 102 may apply an anisotropic low-pass filter to the two-dimensional image. This mitigates aliasing when the pre-processed image is displayed and perceived by a viewer. As another option, the content may be resized by pre-processing circuitry 102. In other words, pre-processing circuitry 102 may change the aspect ratio of the two-dimensional image for a given view (e.g., by shrinking the image in the X-direction that is effected by the lenticular lenses). Anisotropic resizing of this type mitigates aliasing when the pre-processed image is displayed and perceived by the viewer.

Pre-processing may also include various color operations such as tone mapping (e.g., selecting a content-luminance to display-luminance mapping), adjusting color based ambient light level and/or ambient light color (e.g., using ambient light information received by an ambient light sensor in device 10), adjusting color based on brightness settings, saturation adjustment, etc.

Ray tracing block 108 (sometimes referred to as ray tracing circuitry 108) may use a three-dimensional image and stored ray information 110 to determine a pixel map that is used by pixel mapping block 104. FIG. 8 shows an example where the 3D image received by ray tracing circuitry 108 is captured by a 3D camera 114 in electronic device 10.

In one illustrative example, electronic device 10 may be a head-mounted device and 2D camera(s) 112 and 3D camera(s) 114 may be inward-facing cameras on the head-mounted device. In other words, 2D camera(s) 112 and 3D camera(s) 114 face the user that is wearing the head-mounted device during operation of the head-mounted device. In this way, 2D camera(s) 112 and 3D camera(s) 114 may capture images of the user's face during operation of the head-mounted device. The 3D image may provide depth information for the user's face relative to the display. Display 14 may be an outward-facing display on head-mounted device 10 that is configured to present images of the user's face. In other words, display 14 may present images of the user's eyes/face to one or more viewers in a physical environment surrounding the user while the user wears head-mounted device 10.

Said another way, the two-dimensional image and three-dimensional image in FIG. 8 may be images of the same content. In other words, the two-dimensional image may provide color/brightness information for given content while the three-dimensional image provides a depth map associated with the given content.

The example of the two-dimensional image and three-dimensional image in FIG. 8 being captured by cameras 112 and 114 respectively is merely illustrative. Alternatively, the two-dimensional image and/or the three-dimensional image may be computer-generated images. In the event that the two-dimensional image and/or the three-dimensional image are computer-generated images, the computer-generated images may optionally be based on images captured by one or more sensors in input-output devices 12 of electronic device 10 or may optionally be based on images captured by one or more sensors in another electronic device.

The stored ray information 110 may be stored in any desired type of memory. The stored ray information may include, for each sub-pixel in display 14, information on the exit position (from the display) and exit direction (from the display) associated with one or more rays emitted by that sub-pixel. The exit position (sometimes referred to as display exit position) may be a point in three-dimensional space at which the primary ray from that sub-pixel exits lenticular lens film 42. The exit direction (sometimes referred to as display exit direction, exit angle, deflection angle, etc.) may be an angle (e.g., along the X-direction and/or Y-direction) at which the primary ray from that sub-pixel exits lenticular lens film 42. To summarize, the stored ray information measurements characterize the point and direction in three-dimensional space from which light from a given sub-pixel exits the display.

Figure 9:
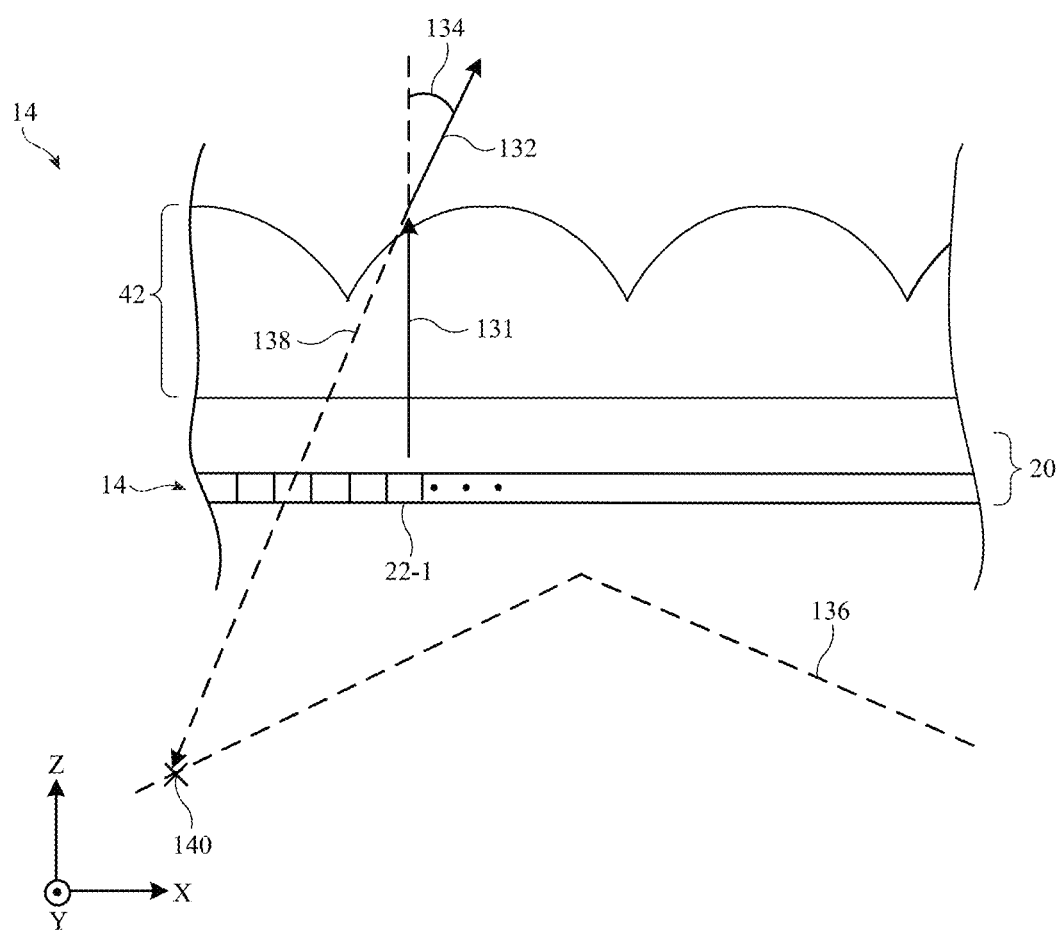
FIG. 9 is a side view of an illustrative display showing how ray tracing may be used to estimate contributions of an input two-dimensional image of content to a three-dimensional image in accordance with some embodiments.

FIG. 9 is a side view of display 14 showing how the ray tracing process may be performed by ray tracing circuitry 108. As shown, a given sub-pixel 22-1 within display 14 may emit light in direction 131 (e.g., in a direction parallel to the surface normal of display panel 20). As shown in FIG. 9, the light may be redirected by lenticular lens film 42 from direction 131 to direction 132. Direction 132 may be at an angle 134 relative to a reference direction (e.g., the surface normal of the lenticular display or another desired reference direction). Each sub-pixel may have an associated direction 132, angle 134, and display exit point (e.g., the position in three-dimensional space at which the primary ray exits lenticular lens film 42 in direction 132). The angle 134 (sometimes referred to as deflection angle 134, horizontal deflection angle 134, etc.) and display exit point for each sub-pixel is stored in ray information 110 in FIG. 8. The deflection angles and display exit points may be obtained during calibration operations during manufacturing electronic device 10, as one example. The deflection measurements and display exit points may be obtained using display calibration parameters such as lens pitch, pixel size, lens alignment, etc.

FIG. 9 shows how display 14 may intend to display a three-dimensional surface 136. Continuing the example above where electronic device is a head-mounted device, the three-dimensional surface 136 may be the surface of the face of the user wearing head-mounted device 10. The target three-dimensional surface may be obtained, for example, from the three-dimensional image received at ray tracing circuitry 108 (as previously shown in FIG. 8). Ray tracing circuitry 108 may, for each sub-pixel in display 14, trace a ray 138 in the opposite direction of the outgoing direction 132 for that sub-pixel. In this way, ray tracing circuitry 108 simulates how a viewer perceives the light from that sub-pixel. Ray tracing circuitry 108 may, for each sub-pixel in display 14, determine the point 140 on three-dimensional surface 136 that is intersected by ray 138. Ray tracing circuitry 108 may also know the correlation (e.g., transform) between a location on the three-dimensional surface (of the given content) 136 and a corresponding location on the corresponding two-dimensional image (of the given content). In this way, ray tracing estimates contributions of the input two-dimensional image of content (e.g., the 2D image from camera 112) to a three-dimensional image (e.g., the image presented on display 14).

As shown in FIG. 8, ray tracing circuitry 108 outputs a pixel map that includes, for each sub-pixel in display 14, the location of a corresponding point on the two-dimensional image of the given content (e.g., the 2D image received by pre-processing circuitry 102). Pixel mapping circuitry 104 subsequently uses the pixel map to map the two-dimensional image that is intended to be displayed on display 14 (e.g., the 2D image received from pre-processing block 102) to the pixel array of display 14. For every sub-pixel of the display, pixel mapping circuitry 104 obtains a corresponding color value from the two-dimensional image that is intended to be displayed on display 14 (using the pixel map with coordinates that identify, for each sub-pixel in display 14, the location of a corresponding point on the two-dimensional image of the given content). The output of pixel mapping block 104 may be referred to as a three-dimensional (3D) image. The 3D image presents the content from different perspectives at multiple views.

After pixel mapping is performed, the array of brightness values for the pixel array may undergo post-processing at block 106. The post-processing may include border masking (e.g., imparting a desired shape to the light-emitting area of the display such as a rectangular shape with rounded corners), burn-in compensation (e.g., compensating the pixel data to mitigate risk of burn-in and/or mitigate visible artifacts caused by burn-in), panel response correction (e.g., mapping luminance levels for each pixel to voltage levels using a gamma curve), color compensation (e.g., using a color lookup table), dithering (e.g., randomly adding noise to the luminance values to reduce distortion when the image is ultimately displayed by the pixel array, manipulated by the lenticular lenses, and viewed by the viewer), etc.

After post-processing is complete, target pixel voltages for each pixel in display 14 may be provided to display driver circuitry 30. Display driver circuitry 30 provides the target pixel voltages to pixel array 62 using data lines (e.g., D in FIG. 2). The images are then displayed on display 14.

Pre-processing block 102 is performed before pixel mapping and therefore may sometimes be referred to as pre-mapping block 102, pre-mapping circuitry 102, pre-mapping-processing block 102, pre-mapping-processing circuitry 102, etc. Post-processing block 106 is performed after pixel mapping and therefore may sometimes be referred to as post-mapping block 106, post-mapping circuitry 106, post-mapping-processing block 106, post-mapping-processing circuitry 106, etc.

Pixel mapping circuitry 104 may perform the pixel mapping operations for each display frame (e.g., at a frequency that is equal to the display frame rate). Similarly, pre-processing 102 and post-processing 106 may be performed at a frequency that is equal to the display frame rate. In contrast, the ray tracing operation performed by ray tracing circuitry 108 may be performed non-periodically or periodically at a second frequency that is lower than the display frame rate. In other words, ray tracing circuitry 108 may output a new pixel map based on an updated depth map at the second frequency. The display frame rate may be at least 5× greater than the second frequency, at least 10× greater than the second frequency, at least 30× greater than the second frequency, at least 50× greater than the second frequency, at least 100× greater than the second frequency, etc. The ray tracing operation performed by ray tracing circuitry 108 (that generates a pixel map) may be asynchronous with the display frame rate. Instead or in addition, external stimuli (e.g., detected by one or more sensors in device 10) may trigger ray tracing circuitry 108 to generate a new pixel map. For example, the ray tracing circuitry may generate a new pixel map if external stimuli indicate that the head-mounted device 10 is being worn by a new user, has been taken on and off by the same user, etc.

The ray tracing operation described in connection with FIGS. 8 and 9 is based on the path 132 of a principle ray associated with each pixel. The principle ray associated with each pixel may refer to the direction at which the brightness of that pixel is greatest. However, the principle ray may not be the only ray associated with each pixel. Crosstalk may result in a range of additional rays being emitted by each pixel (in addition to the principle ray).

Figure 10:
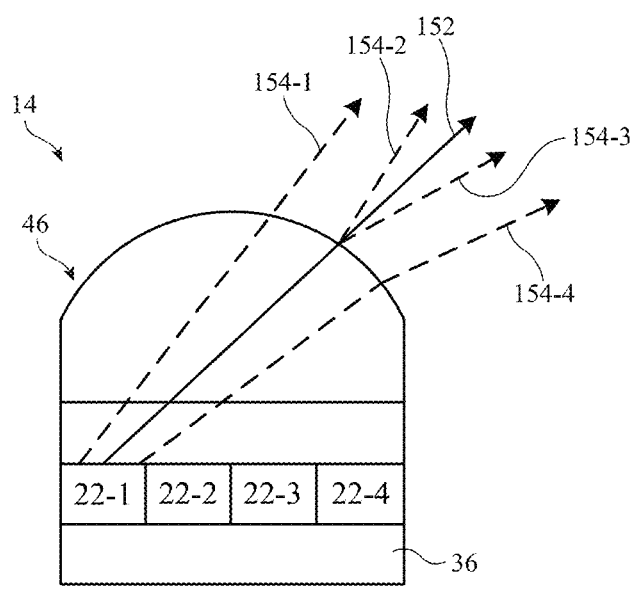
FIG. 10 is a side view of an illustrative lenticular display showing how crosstalk may be generated during operation of the display in accordance with some embodiments.
Figure 11:
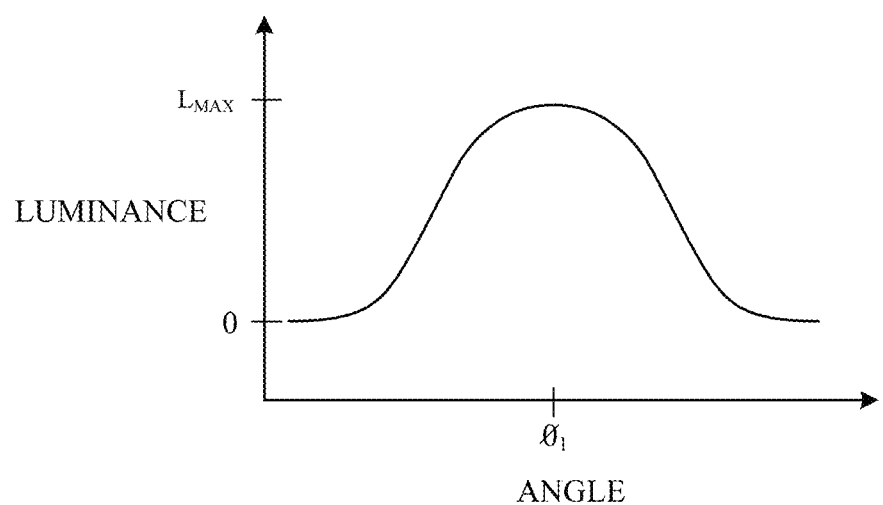
FIG. 11 is an illustrative graph of luminance as a function of viewing angle for a given pixel in accordance with some embodiments.

FIGS. 10 and 11 show how crosstalk is generated within a given display. FIG. 10 is a side view of an illustrative display 14 with pixels 22 under a lenticular lens 46. FIG. 10 shows pixels 22-1, 22-2, 22-3, and 22-4 under a lenticular lens 46. A number of rays corresponding to pixel 22-1 are shown in FIG. 10. In particular, there is a principle ray 152 at which the luminance of pixel 22-1 is greatest. However, optical and/or digital crosstalk cause additional rays such as rays 154-1, 154-2, 154-3, and 154-4 to also be produced by pixel 22-1. The light emitted by pixel 22-1 may follow a profile as shown by the graph in FIG. 11. FIG. 11 shows luminance as a function of viewing angle for a given pixel (e.g., pixel 22-1 in FIG. 10). As shown, the luminance is greatest at a given angle $\theta_1$ and the profile is centered around $\theta_1$. The smooth Gaussian profile shown in FIG. 11 is merely illustrative and in general the luminance may follow a profile of any shape.

It is noted that crosstalk in display 14 is primarily a function of resolution and depth. Resolution may refer to the number of pixels covered by each lenticular lens. When the resolution is high (e.g., when each lenticular lens covers a large number of pixels), artifacts caused by crosstalk are reduced. Depth may refer to the apparent depth of the displayed content behind the display (e.g., three-dimensional surface 136 in FIG. 9 has a depth behind display 14) when perceived by a viewer. When the depth is low, artifacts caused by crosstalk are reduced. When the depth is high, artifacts caused by crosstalk may be more noticeable.

To mitigate the effects of crosstalk in display 14, crosstalk correction may be performed by display pipeline circuitry 116. The crosstalk correction may be performed before pixel mapping, after pixel mapping, and/or during ray tracing and/or pixel mapping operations.

Figure 12:
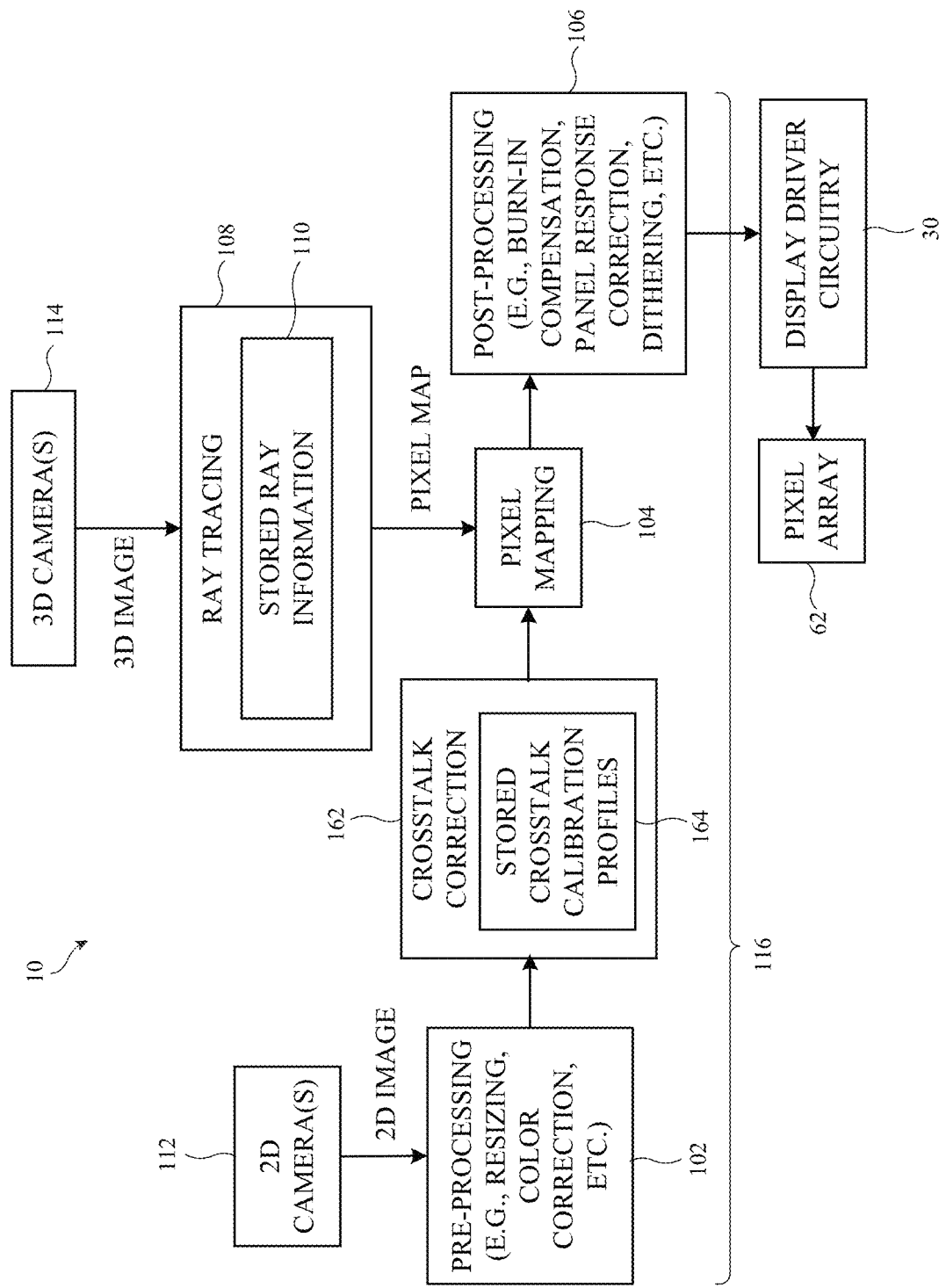
FIG. 12 is a schematic diagram of an illustrative electronic device with display pipeline circuitry that includes a crosstalk correction block before a pixel mapping block in accordance with some embodiments.

FIG. 12 is a schematic diagram of an illustrative electronic device with a crosstalk correction block before the pixel mapping block. In particular, crosstalk correction block 162 (sometimes referred to as crosstalk correction circuitry) may perform crosstalk correction using one or more stored crosstalk calibration profiles 164 (sometimes referred to as stored crosstalk calibration profile information). Each stored crosstalk calibration profile may represent the crosstalk at various depths and positions relative to the surface of display 14.

Figure 13A:
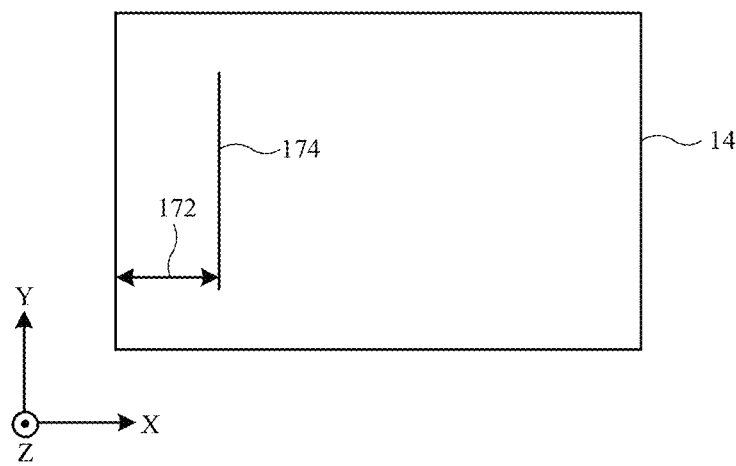
FIG. 13A is a top view of an illustrative lenticular display showing a target vertical line on the display in accordance with some embodiments.

One example of a technique for measuring a crosstalk calibration profile is to display a vertical line for all views across the display (e.g., viewing zones 1-14 in FIG. 6). FIG. 13A shows an example of a target vertical line 174 on display 14. The vertical line may be separated in the X-direction by a distance 172 from the left edge of the display. Distance 172 may be referred to as the X-position of the vertical line. The vertical line may also have a target depth in the Z-direction. The target depth may be the apparent depth of the vertical line behind the lenticular display when viewed by a viewer.

Figure 13B:
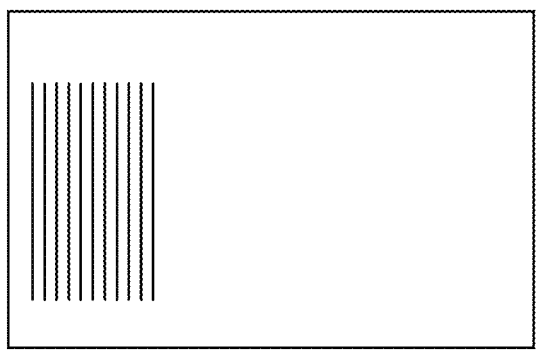
FIG. 13B is a top view of the illustrative lenticular display of FIG. 13A when the lenticular display presents the vertical line across all of the viewing zones in accordance with some embodiments.

FIGS. 13A and 13B show display 14 from a viewing angle that is parallel to the surface normal. Ideally, only a single vertical line would be viewable when viewing display 14 parallel to the surface normal. However, when presenting vertical line 174 across all of the viewing zones, the display may have an appearance as shown in FIG. 13B. From a viewing angle that is parallel to the surface normal, multiple vertical lines are viewable on display 14 due to crosstalk. The additional vertical lines ensure that the vertical line is properly viewable across all of the viewing zones. However, when viewed from a single viewing zone the additional vertical lines are perceived as crosstalk.

Figure 14:
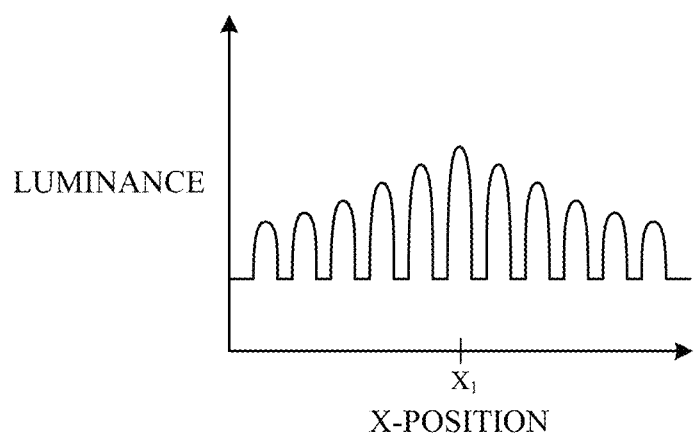
FIG. 14 is an illustrative graph of luminance as a function of X-position across the lenticular display of FIG. 13B in accordance with some embodiments.

FIG. 14 shows a crosstalk calibration profile associated with a vertical bar presented at a given depth (e.g., 5 millimeters behind the display surface) and X-position $X_1$. As shown, the luminance is highest at an X-position on the display that is equal to $X_1$. This peak in luminance may be associated with a 0 degree viewing angle (parallel to the surface normal). The additional peaks in luminance may be associated with additional viewing angles (yet they are still perceptible at a 0 degree viewing angle). FIG. 14 shows an example where the luminance peaks drop in magnitude with increasing distance from $X_1$. There are 11 luminance peaks in the profile of FIG. 14, corresponding to the 11 vertical lines visible in FIG. 13B.

FIG. 14 shows a profile associated with one X-position and one depth in the Z-direction. Stored crosstalk calibration profiles 164 may include profiles at a variety of X-positions and/or Z-directions. During operation of display 14, an appropriate crosstalk calibration profile may be determined using the stored profiles 164 based on the X-position and depth of a given pixel being corrected.

Figure 15:
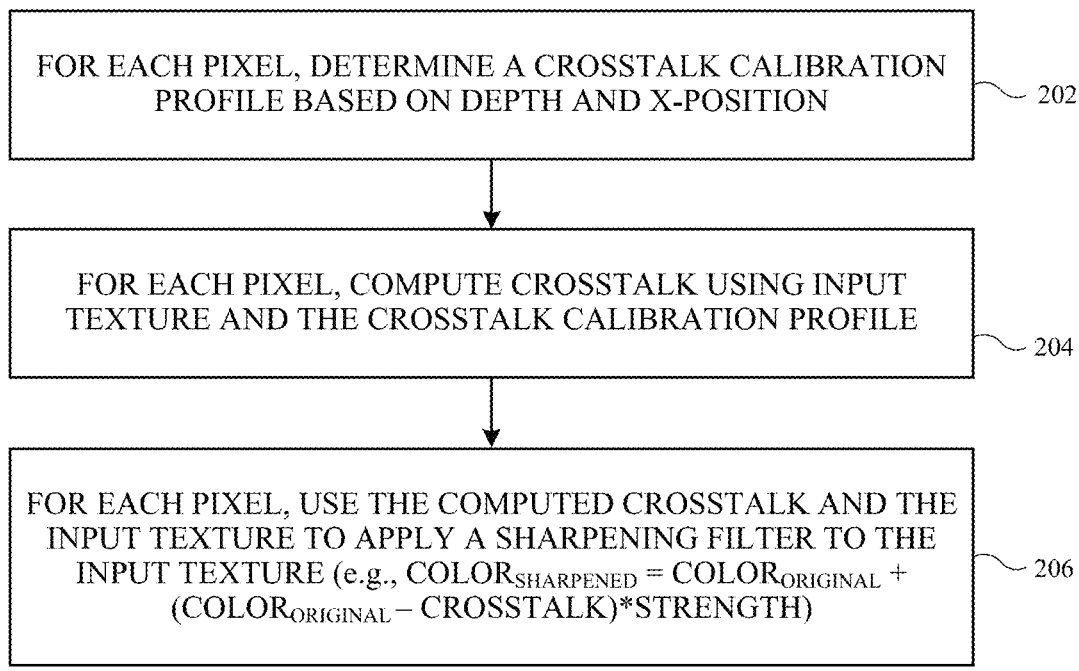
FIG. 15 is a flowchart showing an illustrative method for operating the electronic device of FIG. 12 in accordance with some embodiments.

FIG. 15 is a flowchart showing an illustrative method of operating the electronic device in FIG. 12. Specifically, FIG. 15 shows operations associated with crosstalk correction block 162 of FIG. 12. First, during the operations of block 202, for each pixel in the 2D image received at block 162, a crosstalk calibration profile may be determined based on the depth and X-position of that pixel. There are multiple options for how to determine the appropriate crosstalk calibration profile. As a first example, a crosstalk calibration profile may be selected from stored profiles 164 that has an X-position and depth that is closest to the given pixel. As a second example, interpolation between two or more crosstalk calibration profiles from the stored profiles 164 may be used to derive the crosstalk calibration profile. As a third example, the crosstalk calibration profiles may be stored as a function that outputs a crosstalk calibration profile for a given pixel as a function of depth and X-position.

Next, during the operations of block 204, for each pixel, crosstalk correction circuitry 162 may compute crosstalk using the input texture (e.g., the 2D image received from pre-processing circuitry 102) and the crosstalk calibration profile from block 202. The computed crosstalk is then used to apply a sharpening filter to the input texture during the operations of block 206. Image sharpening is an image processing technique in which an original image is used to create a blurred (sometimes referred to as unsharp) image that is subsequently combined with the original image. The blurred image represents low frequency signals in an image. Herein, the high frequency parts of an image may be emphasized to mitigate crosstalk. The crosstalk determined at block 204 may be used to apply an inverse of the crosstalk to the texture at block 206. During subsequent operations when the texture is ultimately displayed, crosstalk associated with display 14 will tend to cancel out the inverse-crosstalk applied to the texture. The image ultimately perceived by a viewer therefore has less perceived crosstalk than when the operations of FIG. 15 are not performed.

The sharpening filter applied during the operations of block 206 may follow the formula: $COLOR_{SHARPENED}=COLOR_{ORIGINAL}+(COLOR_{ORIGINAL}-CROSSTALK)*STRENGTH$, where $COLOR_{ORIGINAL}$ is the brightness (and/or color) of a pixel from the original texture of the 2D image received from pre-processing circuitry 102, CROSSTALK is the crosstalk computed during the operations of block 204, STRENGTH is an adjustable parameter that is used to tune the performance of the sharpening filter, and $COLOR_{SHARPENED}$ is the brightness (and/or color) of the pixel after the sharpening filter is applied.

Performing the crosstalk correction before pixel mapping (as in FIGS. 12 and 16) may have relatively low computational (and therefore power consumption) demand because the crosstalk correction is performed on the input texture (which may have much fewer pixels than pixel array 62).

It is noted that the example of FIG. 12 in which all of the pre-processing is performed before crosstalk correction is merely illustrative. In general, one or more processing operations may be performed before crosstalk correction and one or more processing operations may be performed after crosstalk correction (and before pixel mapping).

Figure 16:
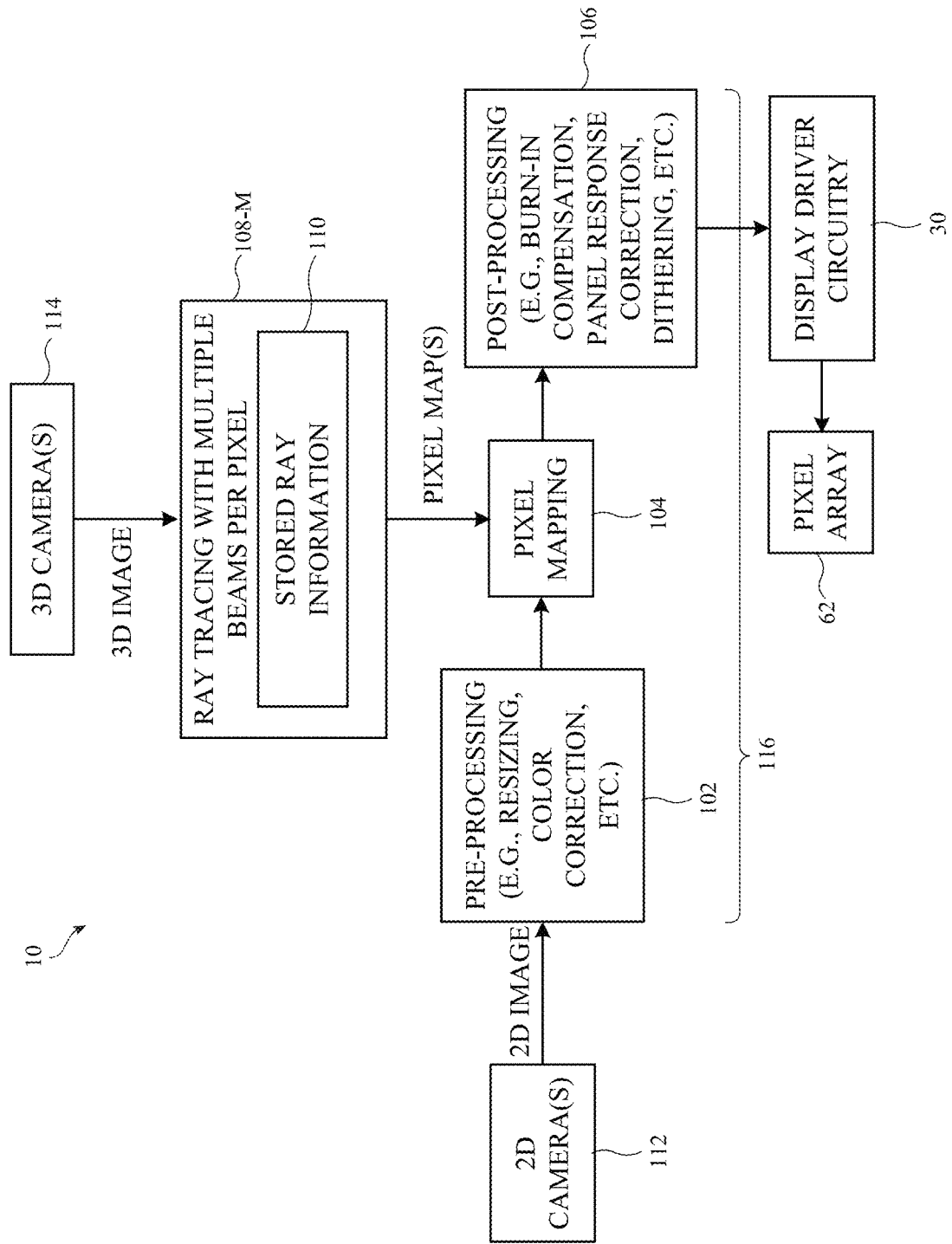
FIG. 16 is a schematic diagram of an illustrative electronic device with display pipeline circuitry that performs ray tracing with multiple beams per pixel in accordance with some embodiments.

Additionally, the example in FIG. 12 of performing crosstalk correction before pixel mapping is merely illustrative. In another possible arrangement, shown in FIG. 16, crosstalk correction may be performed during ray tracing and/or pixel mapping. The display pipeline in FIG. 16 is similar to that of FIG. 8. However, ray tracing block 108-M performs ray tracing using multiple beams per pixel in pixel array 62.

As previously discussed in connection with FIG. 8, ray tracing block 108 in FIG. 8 may perform ray tracing once per pixel using the display exit point and exit angle of the principle ray associated with that pixel. However, in practice additional rays are viewable in addition to the principle ray (as discussed in connection with FIGS. 10 and 11). In ray tracing block 108-M of FIG. 16, multiple rays are traced per pixel. Stored ray information 110 in block 108-M still includes an angle of deflection and a display exit point associated with the principle ray of each pixel. In addition, stored ray information 110 may include angles of deflection and display exit points of one or more secondary rays for each pixel. Instead or in addition, stored ray information 110 may include a spread of angles that is applied to the principle angle for each pixel.

For example, stored ray information may include data for a first given pixel indicating a principle ray has an angle of deflection of 10 degrees and secondary rays have angles of deflection of 0 degrees, 5 degrees, 15 degrees, and 20 degrees. Stored ray information may include data for a second given pixel indicating a principle ray has an angle of deflection of −5 degrees and secondary rays have angles of deflection of −10 degrees, −15 degrees, 0 degrees, and 10 degrees.

As another example, stored ray information may include data indicating a principle ray for a first pixel has an angle of deflection of 10 degrees and a principle ray for a second pixel has an angle of deflection of −5 degrees. The stored ray information may also identify that the secondary rays have angles equal to the principle angle +5 degrees, +10 degrees, and +15 degrees. In other words, the first pixel has secondary rays at angles of 5 degrees, 15 degrees, 0 degrees, 20 degrees, −5 degrees, and 25 degrees whereas the second pixel has secondary rays at angles of −10 degrees, 0 degrees, −15 degrees, 5 degrees, −20 degrees, and 10 degrees. There may also be a stored display exit point associated with each secondary ray.

The ray tracing of the secondary rays may be used to produce multiple pixel maps. For example, a first pixel map is associated with the principle ray for each pixel, a second pixel map is associated with a +5 degree secondary ray for each pixel, a third pixel map is associated with a +10 degree secondary ray for each pixel, a fourth pixel map is associated with a +15 degree secondary ray for each pixel, a fifth pixel map is associated with a −5 degree secondary ray for each pixel, a sixth pixel map is associated with a −10 degree secondary ray for each pixel, and a seventh pixel map is associated with a −15 degree secondary ray for each pixel. Each pixel map may be used to map the 2D image received at pixel mapping block 104 to pixels in pixel array 62. In other words, ray tracing is used to estimate the contributions of the 2D image received at pixel mapping block 104 to a 3D image on pixel array 62 in a plurality of directions through the lenticular lenses of the lenticular display.

An image on pixel array 62 may be referred to as a 3D image (since a viewer will perceive a 3D object when viewing the pixel array through the lenticular lens film). When ray tracing with multiple beams is performed as in FIG. 16, the multiple pixel maps may be used to produce multiple respective 3D images for pixel array 62. Each 3D image may be associated with a respective ray (e.g., one 3D image associated with the principle ray and one 3D image for each secondary ray).

To correct for crosstalk, the multiple 3D images produced by pixel mapping the 2D image (received by pixel mapping block 104) to pixel array 62 may be combined according to a weighted average. The weighted average of the multiple 3D images may be a representation of blur caused by crosstalk. Once the weighted average is obtained, it may subsequently be applied to the 3D image associated with the principle ray in a sharpening filter. The sharpening filter may follow the formula: $COLOR_{SHARPENED}=COLOR_{PRINCIPLE}+(COLOR_{PRINCIPLE}-COLOR_{BLUR})*STRENGTH$, where $COLOR_{PRINCIPLE}$ is the brightness (and/or color) of a pixel from the 3D image associated with the principle ray, $COLOR_{BLUR}$ is the product of the weighted average of the multiple 3D images (e.g., a representation of crosstalk), STRENGTH is an adjustable parameter that is used to tune the performance of the sharpening filter, and $COLOR_{SHARPENED}$ is the brightness (and/or color) of the pixel after the sharpening filter is applied. The sharpened 3D image may be used for subsequent post-processing operations.

The example of multiple pixel maps being generated with each map corresponding to a respective ray is merely illustrative. If desired, substantially the same information may be encoded using a single pixel map (e.g., with multiple 2D pixel locations and/or a range of 2D pixel locations stored for each pixel in pixel array 62).

Figure 17:
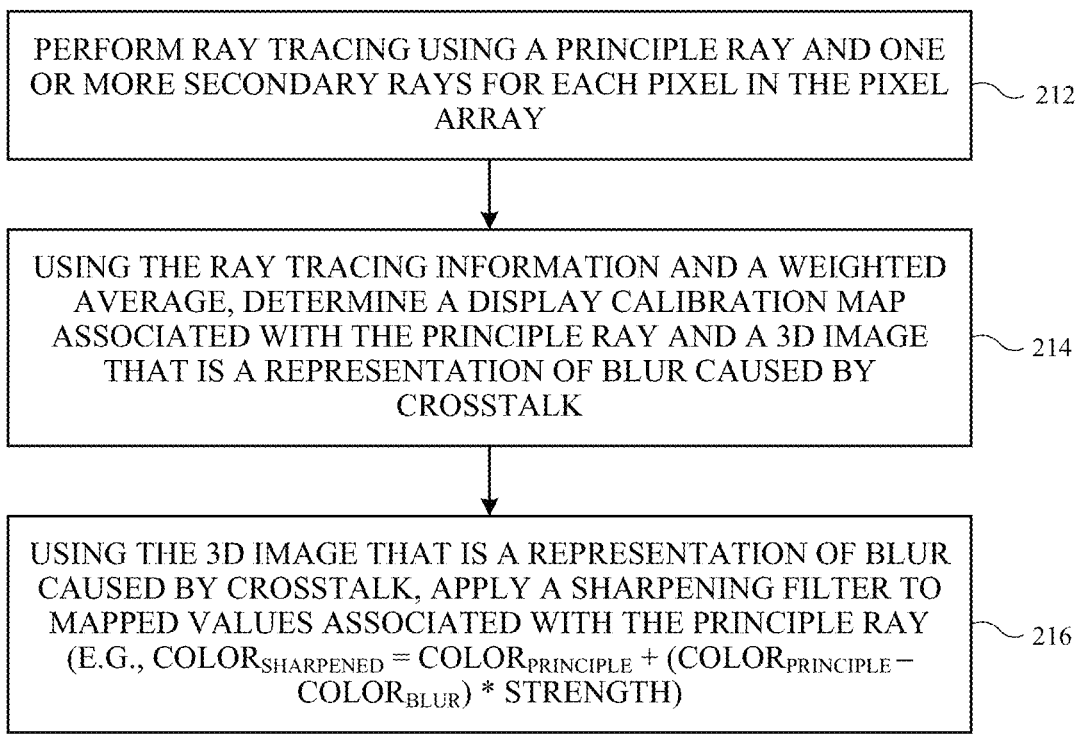
FIG. 17 is a flowchart showing an illustrative method for operating the electronic device of FIG. 16 in accordance with some embodiments.

FIG. 17 is a flowchart showing an illustrative method of operating the electronic device in FIG. 16. Specifically, FIG. 17 shows operations associated with ray tracing block 108-M and pixel mapping block 104 of FIG. 16. First, during the operations of block 212, ray tracing circuitry 108-M may perform ray tracing using multiple beams. Ray tracing may be performed using the principle ray associated with each pixel in pixel array 62. Ray tracing may also be performed using one or more secondary rays associated with each pixel in pixel array 62. The secondary rays may represent crosstalk as represented in FIGS. 10 and 11. In this manner, the ray tracing of block 212 is used to estimate the contribution of an input 2D image to a 3D image in a plurality of directions through the lenticular lenses of display 14.

After performing the ray tracing during the operations of block 212, ray tracing circuitry 108-M and/or pixel mapping circuitry 104 may perform the operations of block 214. During the operations of block 214, the pipeline circuitry may, using the ray tracing information from block 212 and a weighted average, determine a pixel map associated with the principle ray and a 3D image that is a representation of blur caused by crosstalk.

As one example, the ray tracing associated with each ray may produce a corresponding pixel map (e.g., ray tracing of the principle ray for each pixel in pixel array 62 produces a first pixel map associated with the principle ray, ray tracing of a first secondary ray for each pixel in pixel array 62 produces a second pixel map associated with the first secondary ray, ray tracing of a second secondary ray for each pixel in pixel array 62 produces a third pixel map associated with the second secondary ray, etc.).

During the operations of block 214, a weighted average may be obtained that is associated with the principle ray and the one or more secondary rays. The weighted average may be determined before pixel mapping or after pixel mapping.

When the weighted average is determined after pixel mapping, each pixel map from ray tracing circuitry 108-M may be used to obtain a respective 3D image for pixel array 62. The multiple 3D images may then be combined according to a weighted average to obtain a single 3D image that is a representation of blur caused by crosstalk.

When the weighted average is determined before pixel mapping, the multiple pixel maps produced by ray tracing circuitry 108-M may be combined according to a weighted average. The weighted average pixel map may then be used with the input texture to obtain a single 3D image for pixel array 62 that is a representation of blur caused by crosstalk.

Regardless of whether the weighted average is determined before or after pixel mapping, the final result of the operations of block 214 is a 3D image for pixel array 62 that is a representation of blur caused by crosstalk. Subsequently, during the operations of block 216, that 3D image may be used in combination with a 3D image associated solely with the principle ray (e.g., a 3D image mapped using a pixel map produced by ray tracing using only the principle ray for each pixel) to apply a sharpening filter. As previously discussed, the sharpening filter may follow the formula: $COLOR_{SHARPENED} = COLOR_{PRINCIPLE} + (COLOR_{PRINCIPLE} - COLOR_{BLUR}) * STRENGTH$, where $COLOR_{PRINCIPLE}$ is the brightness and/or color of a pixel from the 3D image associated with only the principle ray, $COLOR_{BLUR}$ is the 3D image for pixel array 62 that is a representation of blur caused by crosstalk, STRENGTH is an adjustable parameter that is used to tune the performance of the sharpening filter, and $COLOR_{SHARPENED}$ is the brightness and/or color of the pixel after the sharpening filter is applied. The sharpened 3D image may be used for subsequent post-processing operations.

Performing the crosstalk correction before pixel mapping (as in FIG. 12) means that the crosstalk correction is the same for all viewing angles (because the 2D image has not undergone any positioning in three-dimensional space yet and therefore viewing angles have not been introduced at the time of this crosstalk correction). Performing the crosstalk correction during ray tracing and/or pixel mapping (as in FIGS. 16 and 17) may advantageously take into account different viewing angles.

Figure 18:
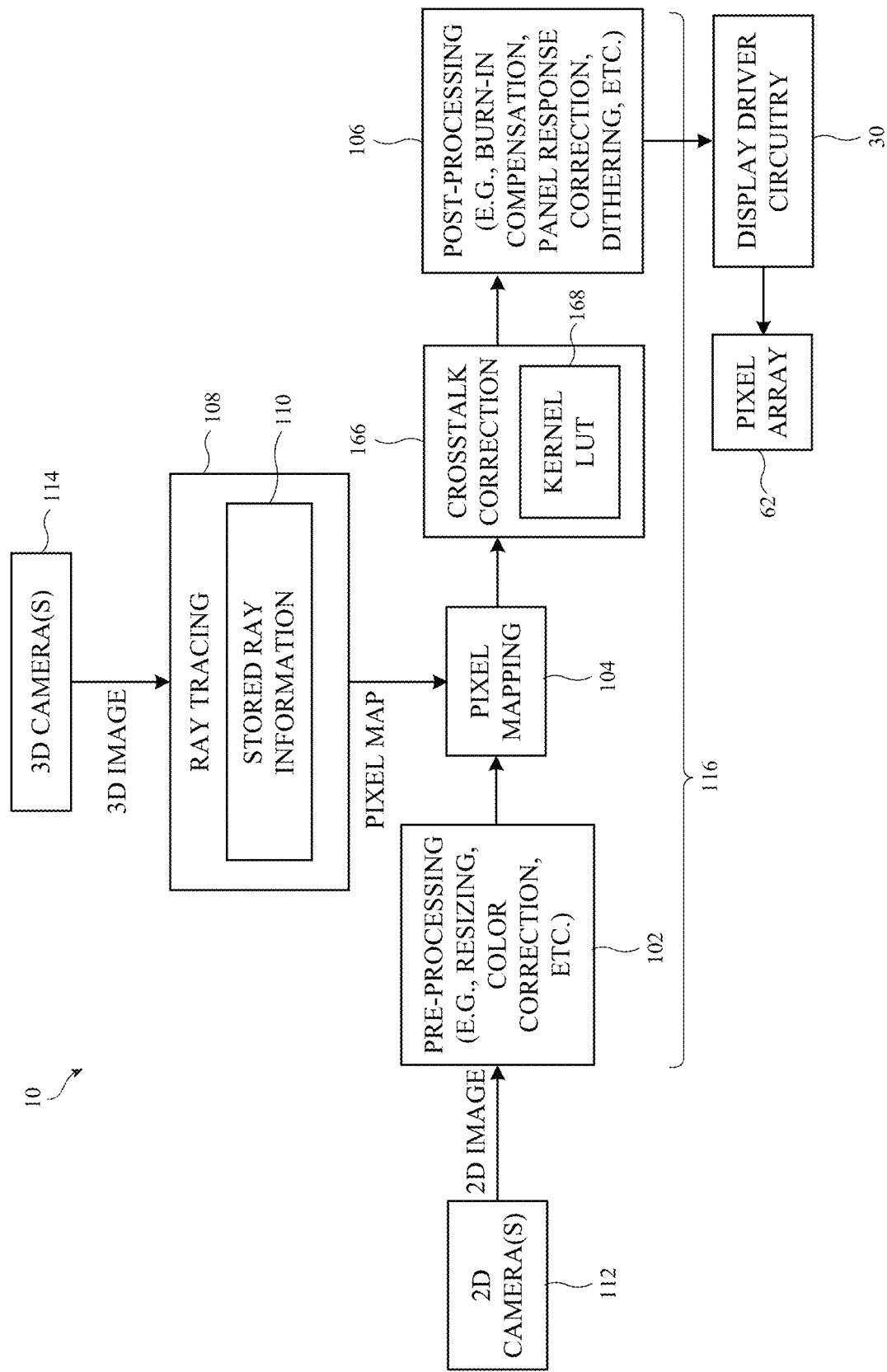
FIG. 18 is a schematic diagram of an illustrative electronic device with display pipeline circuitry that includes a crosstalk correction block after a pixel mapping block in accordance with some embodiments.

In another possible arrangement, shown in FIG. 18, crosstalk correction may be performed after pixel mapping. The display pipeline in FIG. 18 is similar to that of FIG. 8. However, the display pipeline includes crosstalk correction block 166 after pixel mapping 104 and before post-processing 106.

Crosstalk correction block 166 (sometimes referred to as crosstalk correction circuitry) may include a lookup table (LUT) 168 that includes a plurality of kernels. The example of including a LUT is merely illustrative and crosstalk correction block 166 may store only a single kernel if desired. Each kernel in the lookup table may be a matrix that is a digital description of the physical blur caused by crosstalk in display 14. The kernels (sometimes referred to as blur kernels) may include weights of influence from each neighboring pixel (see FIG. 11 as an example of how a pixel influences neighboring pixels).

The physical blur caused by crosstalk in display 14 may be a function of the X-position of a given pixel relative to the overlapping lenticular lens for that pixel. Therefore, in one example the kernel LUT may include a plurality of kernels, each kernel associated with a respective X-position relative to an overlapping lenticular lens (e.g., kernel LUT 168 may include 32 blur kernels associated with different X-positions). This example is merely illustrative. In another possible arrangement, only one kernel may be stored and that common kernel may be applied to each pixel.

Each blur kernel may be a matrix of any desired size. As one example, each blur kernel may be a 5×5 matrix (e.g., a square matrix with an equal number of rows and columns). The kernel may instead be non-square rectangular (e.g., with a different number of rows than columns) if desired. As one specific example, the kernel may be a 5×3 matrix with five rows and three columns. In general, for the display herein, vertically neighboring pixels may contribute more crosstalk than horizontally neighboring pixels. The vertical design for the kernel (e.g., more rows than columns) allows for more vertically neighboring pixels to be accounted for during crosstalk compensation than horizontally neighboring pixels.

During operation, crosstalk correction block 166 may, for each pixel in pixel array 62, identify a corresponding kernel. In the example where the kernel varies as a function of the X-position of the pixel, a kernel from LUT may be identified for each pixel based on the X-position of the pixel. If there is not an exact match between the X-position of the given pixel and the X-position of one of the kernels in the LUT, the kernel with the closest X-position may be used. Alternatively, interpolation between two or more of the kernels with the closest X-positions may be used to compute a kernel for the X-position of the given pixel. In an alternate example, the same kernel is used for each pixel in pixel array 62.

After the kernel for each pixel is identified, the kernels may be applied to pixels in a convolution pass. The output brightness value for each pixel may be equal to the weighted sum of the input brightness of the given pixel and the neighboring pixels. The ratios of the weighted average used for a given pixel are determined by the respective kernel for that pixel.

It is noted that magnitudes used in the different kernels may be determined by modeling and/or measuring the interaction of each pixel with its neighboring pixel(s). For a given pixel, the contributions of each neighbor pixel may be measured and stored in a kernel matrix. During application of the kernels, the kernels may only be applied to pixels that are overlapped by a common lenticular lens. Neighboring pixels that are overlapped by a different lenticular lens may be weighted less when applying the kernel.

Figure 19:
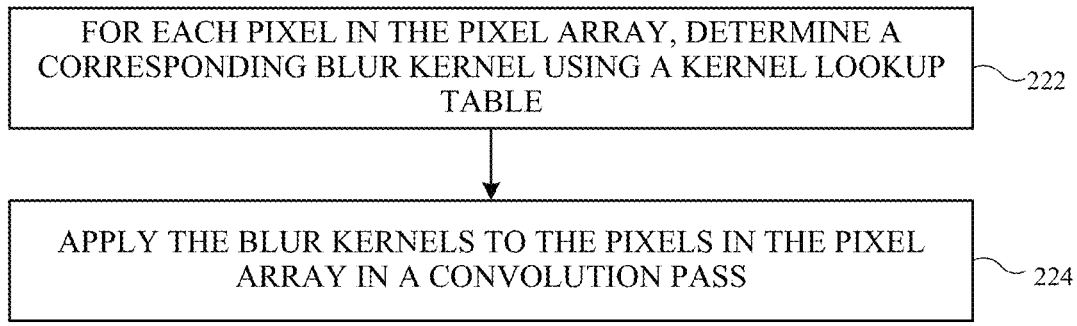
FIG. 19 is a flowchart showing an illustrative method for operating the electronic device of FIG. 18 in accordance with some embodiments.

FIG. 19 is a flowchart showing an illustrative method of operating the electronic device in FIG. 18. Specifically, FIG. 19 shows operations associated with crosstalk correction block 166 of FIG. 18. First, during the operations of block 222, crosstalk correction circuitry 166 may determine a blur kernel for each pixel in pixel array 62 (e.g., using a kernel lookup table). In the example where the kernel varies as a function of the X-position of the pixel, a kernel from LUT may be identified for each pixel based on the X-position of the pixel. The blur kernel may be selected based on the X-position of the pixel relative to an overlapping lenticular lens. The kernel with the closest X-position to the X-position of the pixel may be used. Alternatively, interpolation between two or more of the kernels with the closest X-positions to the X-position of the pixel may be used to compute a kernel for the pixel.

During the operations of block 224, the blur kernels from block 222 may be applied to the pixels in the pixel array in a convolution pass. The pixels in pixel array 62 may have corresponding brightness values. The brightness values of the pixels may be modified using the blur kernels to obtain a 3D image that is pre-compensated for crosstalk. When the pre-compensated 3D image is displayed on lenticular display 14, the image perceived by the viewer will have mitigated crosstalk artifacts due to the crosstalk compensation.

The example in FIG. 19 of determining the kernels in block 222 and then applying the kernels in block 224 is merely illustrative. If desired, a kernel may be selected for a given pixel and then applied to that pixel before repeating the process with the next pixel.

The contrast between neighboring pixels increases with depth, because the neighboring pixels show increasingly different angles of content with increasing depth. In each one of the crosstalk mitigation techniques of FIGS. 15, 17, and 19, depth (e.g., the apparent depth of the displayed content behind the display when perceived by a viewer) is taken into account. In FIG. 15, depth is measured (e.g., by 3D camera(s) 114) and explicitly used to determine the crosstalk calibration profile as discussed in connection with the operations of block 202. In FIG. 17, ray tracing naturally takes into account depth when tracing the ray from the display to a three-dimensional surface (e.g., surface 136 in FIG. 9). In FIG. 19, the kernels are determined by modeling the interaction of each pixel with its neighboring pixel(s), which increases with depth.

In each one of FIGS. 8, 12, 16, and 18, each component of display pipeline circuitry 116 (e.g., pre-processing block 102, pixel mapping block 104, post-processing block 106, ray tracing block 108, crosstalk correction block 162, ray tracing block 108-M, crosstalk correction block 166) may be implemented in SOC 64, GPU 66, and/or display driver circuitry 30 of control circuitry 16.

It is further noted that two or more of the crosstalk correction techniques described herein may be included in a single display pipeline if desired.

The foregoing is merely illustrative and various modifications can be made to the described embodiments. The foregoing embodiments may be implemented individually or in any combination.

What is claimed is:

1. A method of operating an electronic device with a camera configured to capture a first image and a lenticular display having a plurality of lenticular lenses over an array of pixels, the method comprising:
    for each pixel in the first image, determining a corresponding crosstalk calibration profile based on stored crosstalk calibration profile information, a position of that pixel, and a depth associated with that pixel;
    for each pixel in the first image, determining crosstalk using the crosstalk calibration profile for that pixel;
    obtaining a second image by applying a sharpening filter to the first image using the determined crosstalk for each pixel; and
    mapping the second image to the display.

2. The method defined in claim 1, wherein determining crosstalk using the crosstalk calibration profile for that pixel comprises determining crosstalk using an input texture of the first image and the crosstalk calibration profile for that pixel.

3. The method defined in claim 1, wherein the second image is a two-dimensional image of content and wherein mapping the second image to the display comprises generating a plurality of views of the content.

4. The method defined in claim 1, wherein mapping the second image to the display comprises mapping the second image to a third image with more pixels than the second image and wherein the method further comprises displaying the third image on the display.

5. The method defined in claim 1, further comprising:
    before determining the corresponding crosstalk calibration profile for each pixel in the first image, adjusting one or more brightness magnitudes in the first image.

6. The method defined in claim 1, further comprising:
    after mapping the second image to the display, adjusting one or more brightness magnitudes in the second image.

7. The method defined in claim 1, wherein the second image is equal to the first image plus a difference between the first image and the determined crosstalk multiplied by a scaling factor.

8. The method defined in claim 1, wherein mapping the second image to the display comprises mapping the second image to the display based on a third image captured by an additional camera, wherein the third image comprises a three-dimensional image.

9. A method of operating an electronic device with a display having an array of pixels and a plurality of lenticular lenses that overlaps the array of pixels, the method comprising:
    estimating contributions for each pixel in the array of pixels of an input two-dimensional image of content to a first three-dimensional image in a plurality of directions through the plurality of lenticular lenses;
    generating a second three-dimensional image having a plurality of views of the content; and
    based on the estimated contributions for each pixel, mitigating crosstalk between different pixels in the array of pixels associated with different views of the plurality of views.

10. The method defined in claim 9, wherein estimating contributions for each pixel in the array of pixels of the input two-dimensional image to the first three-dimensional image in the plurality of directions through the plurality of lenticular lenses comprises ray tracing multiple rays for each pixel in the array of pixels using stored ray information and wherein each pixel in the array of pixels has at least one corresponding deflection angle and display exit point in the stored ray information.

11. The method defined in claim 10, wherein ray tracing multiple rays for each pixel in the array of pixels comprises:
ray tracing a principle ray for each pixel in the array of pixels; and
ray tracing one or more secondary rays for each pixel in the array of pixels.

12. The method defined in claim 11, wherein information from ray tracing the principle ray for each pixel in the array of pixels is used to determine a pixel map associated with the principle ray for each pixel and wherein information from ray tracing the one or more secondary rays for each pixel in the array of pixels is used to determine one or more additional pixel maps that are each associated with a respective secondary ray for each pixel.

13. The method defined in claim 12, wherein mitigating crosstalk between different pixels in the array of pixels associated with different views of the plurality of views comprises:
using the pixel map and the additional pixel maps to obtain a plurality of images for the array of pixels; and
combining the plurality of images using a weighted average to obtain a representation of blur caused by crosstalk.

14. The method defined in claim 13, wherein mitigating crosstalk between different pixels in the array of pixels associated with different views of the plurality of views comprises:
applying a sharpening filter to the second three-dimensional image using the representation of blur caused by crosstalk.

15. The method defined in claim 9, wherein the first three-dimensional image is captured by a first camera in the electronic device and wherein the input two-dimensional image is captured by a second camera in the electronic device.

16. A method of operating an electronic device with a lenticular display having a plurality of lenticular lenses over an array of pixels, the method comprising:
mapping a two-dimensional image of content to the array of pixels to obtain a three-dimensional image having a plurality of views of the content;
for each pixel in the array of pixels, determining a corresponding blur kernel;
applying the blur kernels to the three-dimensional image in a convolution pass to mitigate crosstalk;
after applying the blur kernels to the three-dimensional image in the convolution pass to mitigate crosstalk, adjusting one or more brightness magnitudes in the three-dimensional image; and
after adjusting the one or more brightness magnitudes in the three-dimensional image, displaying the three-dimensional image on the display.

17. The method defined in claim 16, wherein adjusting the one or more brightness magnitudes in the three-dimensional image comprises performing a processing operation selected from the group consisting of: border masking, burn-in compensation, panel response correction, color compensation, and dithering.

18. The method defined in claim 16, further comprising:
before mapping the two-dimensional image of the content to the array of pixels to obtain the three-dimensional image having the plurality of views of the content, adjusting additional brightness magnitudes in the two-dimensional image.

19. The method defined in claim 18, wherein adjusting additional brightness magnitudes in the two-dimensional image comprises performing a processing operation selected from the group consisting of: filtering, anisotropic resizing, tone mapping, and saturation adjustment.

20. The method defined in claim 16, wherein determining the corresponding blur kernel comprises determining the corresponding blur kernel using a lookup table based on a position of each pixel relative to an overlapping lenticular lens of the plurality of lenticular lenses.

* * * * *